(12) United States Patent
Baek et al.

(10) Patent No.: US 12,538,256 B2
(45) Date of Patent: Jan. 27, 2026

(54) METHOD AND DEVICE FOR TRANSMITTING OR RECEIVING POSITIONING-RELATED SIGNAL BY TERMINAL IN WIRELESS COMMUNICATION SYSTEM SUPPORTING SIDELINK

(71) Applicant: LG ELECTRONICS INC., Seoul (KR)

(72) Inventors: Jongseob Baek, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 346 days.

(21) Appl. No.: 18/033,182

(22) PCT Filed: Jun. 29, 2021

(86) PCT No.: PCT/KR2021/008149
§ 371 (c)(1),
(2) Date: Apr. 21, 2023

(87) PCT Pub. No.: WO2022/085894
PCT Pub. Date: Apr. 28, 2022

(65) Prior Publication Data
US 2023/0397150 A1    Dec. 7, 2023

(30) Foreign Application Priority Data

Oct. 21, 2020  (KR) .......................... 10-2020-0136510
Nov. 11, 2020  (KR) .......................... 10-2020-0149823
Dec. 24, 2020  (KR) .......................... 10-2020-0183775

(51) Int. Cl.
*H04W 64/00*   (2009.01)
*H04L 5/00*    (2006.01)

(52) U.S. Cl.
CPC ........... *H04W 64/00* (2013.01); *H04L 5/0051* (2013.01)

(58) Field of Classification Search
CPC ..... H04W 4/025; H04W 4/40; H04W 52/243; H04W 52/367; H04W 64/00; H04W 92/18
(Continued)

(56) References Cited

U.S. PATENT DOCUMENTS 12,072,428 B2 *   8/2024   Manolakos ........... H04L 5/0051
12,164,047 B2 *  12/2024   Baek ..................... H04L 5/0051
(Continued)

FOREIGN PATENT DOCUMENTS

WO    2020061944    4/2020

OTHER PUBLICATIONS

European Patent Office Application Serial No. 21882968.7, Search Report dated Aug. 27, 2024, 9 pages.

*Primary Examiner* — Joseph Arevalo
(74) *Attorney, Agent, or Firm* — LEE, HONG, DEGERMAN, KANG & WAIMEY

(57) ABSTRACT

Disclosed are a method for transmitting a response PRS, the method comprising the steps of: receiving slot configuration information for configuration of a plurality of slot groups related to the PRS; receiving a request PRS for requesting transmission of the response PRS in one slot group among the plurality of slot groups; and transmitting the response PRS and positioning information on the basis of the slot configuration information, wherein the response PRS is transmitted in a second slot determined on the basis of the slot configuration information and a position of a first slot, in which the request PRS has been received, from among a plurality of slots included in the one slot group, and whether the positioning information is transmitted with the response
(Continued)

(a)

(b)

PRS in the second slot is determined on the basis of whether the first slot and the second slot are continuous in a time domain.

6 Claims, 29 Drawing Sheets

(58) Field of Classification Search
USPC .................................. 370/329, 503, 330, 252
See application file for complete search history.

(56) References Cited

U.S. PATENT DOCUMENTS

| | | | |
|---|---|---|---|
| 2018/0048444 A1* | 2/2018 | Park | H04L 5/0048 |
| 2019/0230618 A1 | 7/2019 | Saur et al. | |
| 2020/0052845 A1* | 2/2020 | Chuang | H04L 5/0048 |
| 2020/0120682 A1* | 4/2020 | Li | H04L 1/1812 |
| 2021/0058890 A1* | 2/2021 | Akkarakaran | G01S 5/0221 |
| 2021/0227602 A1* | 7/2021 | Li | H04W 76/14 |
| 2021/0389410 A1* | 12/2021 | Yerramalli | H04W 64/00 |
| 2021/0400626 A1* | 12/2021 | Yerramalli | H04L 5/0048 |
| 2022/0014327 A1* | 1/2022 | Yerramalli | G01S 5/06 |
| 2022/0069962 A1* | 3/2022 | Bao | H04W 72/044 |
| 2022/0078747 A1* | 3/2022 | Duan | H04W 52/0216 |
| 2022/0086822 A1* | 3/2022 | Bao | G01S 1/024 |
| 2022/0312154 A1* | 9/2022 | Yerramalli | G01S 5/02216 |
| 2022/0373635 A1* | 11/2022 | Bao | H04W 64/00 |
| 2023/0180177 A1* | 6/2023 | Manolakos | H04L 5/0051 |
| 2023/0209494 A1* | 6/2023 | Dai | H04W 64/00 455/456.6 |
| 2023/0261814 A1* | 8/2023 | Yerramalli | G01S 5/0205 370/330 |
| 2023/0269694 A1* | 8/2023 | Manolakos | H04W 64/00 455/456.1 |
| 2023/0309066 A1* | 9/2023 | Ganesan | H04W 72/02 |
| 2023/0354245 A1* | 11/2023 | Manolakos | H04L 5/0048 |

* cited by examiner (a)

(b)

(a)

(b)

METHOD AND DEVICE FOR TRANSMITTING OR RECEIVING POSITIONING-RELATED SIGNAL BY TERMINAL IN WIRELESS COMMUNICATION SYSTEM SUPPORTING SIDELINK

CROSS-REFERENCE TO RELATED APPLICATION(S)

This application is the National Stage filing under 35 U.S.C. 371 of International Application No. PCT/KR2021/008149, filed on Jun. 29, 2021, which claims the benefit of earlier filing date and right of priority to Korean Application Nos. 10-2020-0136510, filed on Oct. 21, 2020, 10-2020-0149823, filed on Nov. 11, 2020, and 10-2020-0183775, filed on Dec. 24, 2020, the contents of which are all incorporated by reference herein in their entirety.

TECHNICAL FIELD

The present disclosure relates to a method of transmitting and receiving signals related to positioning by a user equipment (UE) based on a slot structure configured for the positioning in a wireless communication system supporting sidelink and apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

The object of the present disclosure is to provide a method and apparatus for efficiently determining a slot for transmitting a response positioning reference signal (PRS) and positioning information based on slot configuration information for transmission and reception of a request RPS and the response PRS.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

In an aspect of the present disclosure, there is provided a method of transmitting a response positioning reference signal (PRS) by a first user equipment (UE) in a wireless communication system supporting sidelink communication. The method may include: receiving slot configuration information configuring a plurality of slot groups related to a PRS; receiving a request PRS requesting transmission of the response PRS in one slot group among the plurality of slot groups; and transmitting the response PRS and positioning information based on the slot configuration information. The response PRS may be transmitted in a second slot determined based on a location of a first slot in which the request PRS is received among a plurality of slots included in the one slot group and the slot configuration information. Whether the positioning information is transmitted in the second slot together with the response PRS may be determined depending on whether the first slot and the second slot are consecutive in a time domain.

Alternatively, based on that the first slot and the second slot are consecutive in the time domain, the positioning information may be transmitted in a third slot rather than the second slot in which the response PRS is transmitted.

Alternatively, based on that the first slot and the second slot are discontinuous in the time domain, the positioning information may be transmitted in the second slot together with the response PRS.

Alternatively, the positioning information may include a difference between a time at which the request PRS is received and a time at which the response PRS is transmitted.

Alternatively, based on that at least two slots are specified based on the location of the first slot and the slot configuration information, the second slot may be determined as a slot adjacent to the first slot in the time domain among the at least two slots based on a speed of the first UE that is greater than or equal to a predetermined threshold speed.

Alternatively, the plurality of slot groups may be configured by SL-PRSslotgroupjump related to an interval between the plurality of slot groups included and PRS-ResourceRepetitionFactor related to a number of slots included in the one slot group, and SL-PRSslotgroupjump and PRS-ResourceRepetitionFactor may be included in the slot configuration information.

Alternatively, SL-PRSslotgroupjump may be determined based on a number of UEs participating in positioning related to the request PRS.

Alternatively, based on that the request PRS is related to sidelink round trip time (RTT) positioning, the second slot may be determined within the one slot group, and based on the request PRS is related to sidelink time difference of arrival (TDoA) positioning, the second slot may be determined in a slot group different from the one slot group.

In another aspect of the present disclosure, there is provided a method of receiving a response PRS by a second UE in a wireless communication system supporting sidelink communication. The method may include: receiving slot configuration information configuring a plurality of slot groups related to a PRS; transmitting a request PRS in one slot group among the plurality of slot groups; and receiving the response PRS and positioning information based on the slot configuration information. The response PRS may be received in a second slot determined based on a location of a first slot in which the request PRS is transmitted among a plurality of slots included in the one slot group and the slot configuration information. Whether the positioning information is received in the second slot together with the response PRS may be determined depending on whether the first slot and the second slot are consecutive in a time domain.

Alternatively, based on that the first slot and the second slot are discontinuous in the time domain, the positioning information may be received in the second slot together with the response PRS. Based on that the first slot and the second slot are consecutive in the time domain, the positioning information may be received in a third slot rather than the second slot in which the response PRS is received.

In another aspect of the present disclosure, there is provided a first UE configured to transmit a response PRS in a wireless communication system supporting sidelink communication. The first UE may include: a radio frequency (RF) transceiver; and a processor connected to the RF transceiver. The processor may be configured to control the RF transceiver to: receive slot configuration information configuring a plurality of slot groups related to a PRS; receive a request PRS requesting transmission of the response PRS in one slot group among the plurality of slot groups; and transmit the response PRS and positioning information based on the slot configuration information. The response PRS may be transmitted in a second slot determined based on a location of a first slot in which the request PRS is received among a plurality of slots included in the one slot group and the slot configuration information. Whether the positioning information is transmitted in the second slot together with the response PRS may be determined depending on whether the first slot and the second slot are consecutive in a time domain.

In another aspect of the present disclosure, there is provided a second UE configured to receive a response PRS in a wireless communication system supporting sidelink. The second UE may include: an RF transceiver; and a processor connected to the RF transceiver. The processor may be configured to control the RF transceiver to: receive slot configuration information configuring a plurality of slot groups related to a PRS; transmit a request PRS in one slot group among the plurality of slot groups; and receive the response PRS and positioning information based on the slot configuration information. The response PRS may be received in a second slot determined based on a location of a first slot in which the request PRS is transmitted among a plurality of slots included in the one slot group and the slot configuration information. Whether the positioning information is received in the second slot together with the response PRS may be determined depending on whether the first slot and the second slot are consecutive in a time domain.

In another aspect of the present disclosure, there is provided a chipset configured to transmit a response PRS in a wireless communication system supporting sidelink. The chipset may include: at least one processor; and at least one memory operably connected to the at least one processor and configured to, when executed, cause the at least one processor to perform operations. The operations may include: receiving slot configuration information configuring a plurality of slot groups related to a PRS; receiving a request PRS requesting transmission of the response PRS in one slot group among the plurality of slot groups; and transmitting the response PRS and positioning information based on the slot configuration information. The response PRS may be transmitted in a second slot determined based on a location of a first slot in which the request PRS is received among a plurality of slots included in the one slot group and the slot configuration information. Whether the positioning information is transmitted in the second slot together with the response PRS may be determined depending on whether the first slot and the second slot are consecutive in a time domain.

Alternatively, the processor may be configured to control a driving mode of a device connected to the chipset based on the positioning information.

In a further aspect of the present disclosure, there is provided a computer-readable storage medium including at least one computer program configured to cause at least one processor to perform operations of transmitting a response PRS in a wireless communication system supporting sidelink. The least one computer program may be configured to cause the at least one processor to perform the operations of transmitting the response PRS. The at least one computer program may be stored on the computer-readable storage medium. The operations may include: receiving slot configuration information configuring a plurality of slot groups related to a PRS; receiving a request PRS requesting transmission of the response PRS in one slot group among the plurality of slot groups; and transmitting the response PRS and positioning information based on the slot configuration information. The response PRS may be transmitted in a second slot determined based on a location of a first slot in which the request PRS is received among a plurality of slots included in the one slot group and the slot configuration information. Whether the positioning information is transmitted in the second slot together with the response PRS may be determined depending on whether the first slot and the second slot are consecutive in a time domain.

According to various embodiments, a slot for transmitting a response positioning reference signal (PRS) and positioning information may be efficiently determined based on slot configuration information for transmission and reception of a request RPS and the response PRS.

Effects to be achieved by various embodiments are not limited to what has been particularly described hereinabove and other effects not mentioned herein will be more clearly understood by persons skilled in the art to which the present disclosure pertains from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
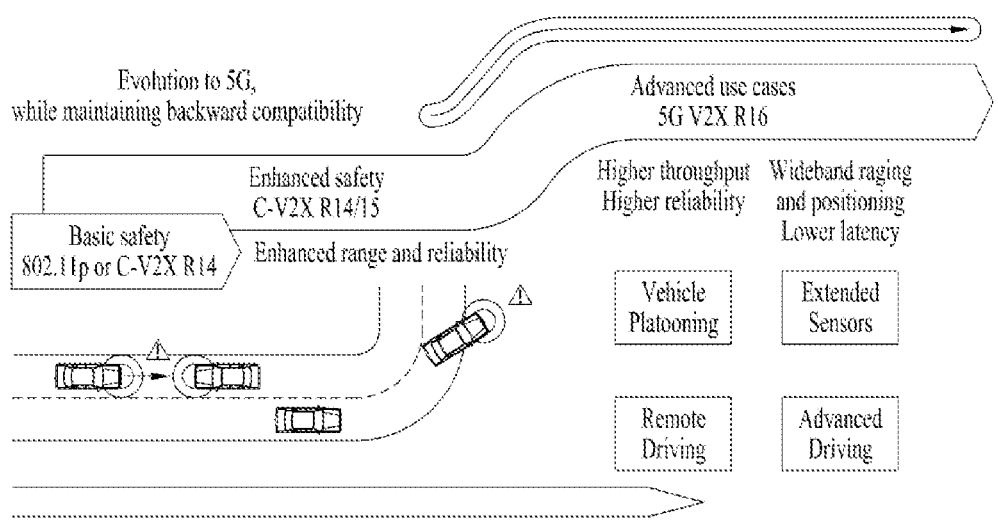
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. IEEE 802.16m is an evolution of IEEE 802.16e and provides backward compatibility with a system based on IEEE 802.16e. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
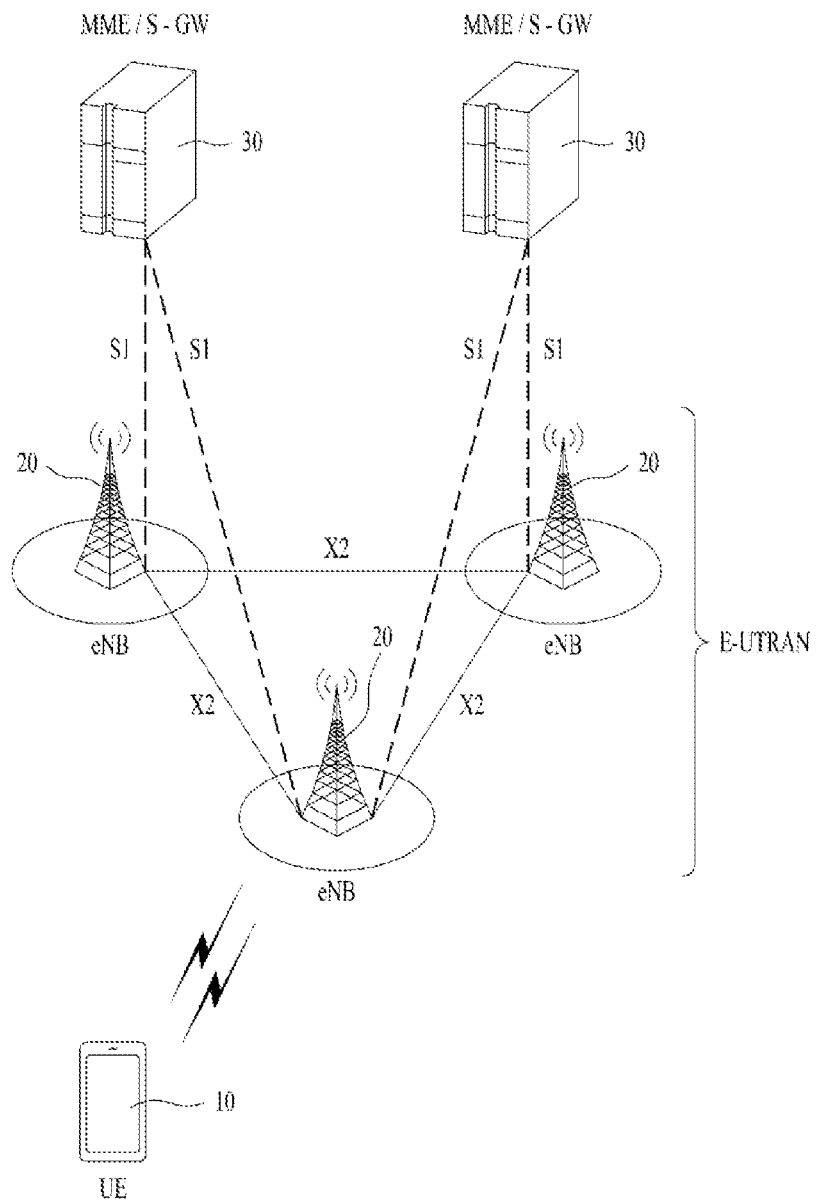
FIG. 2 illustrates the structure of an LTE system.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
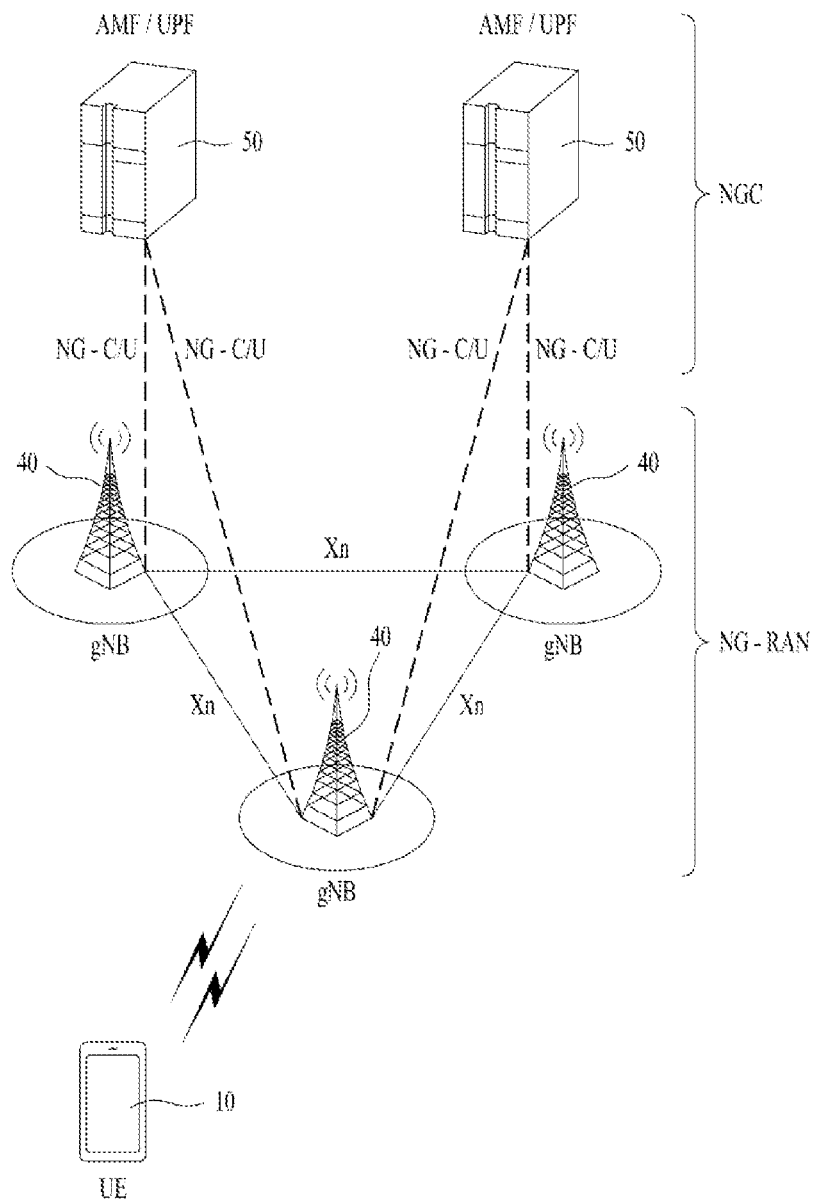
FIG. 3 illustrates the structure of an NR system.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
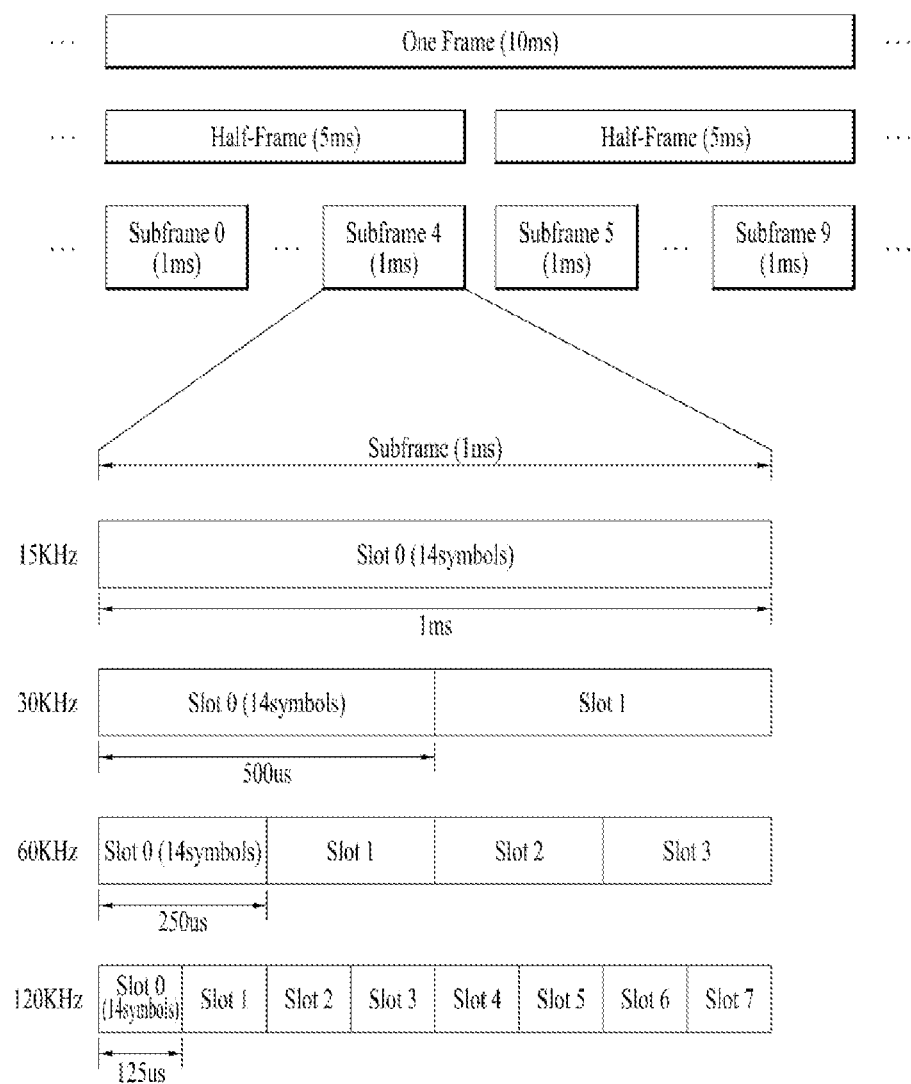
FIG. 4 illustrates the structure of an NR radio frame.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot ($N^{slot}_{symb}$), the number of slots per frame ($N^{frame,u}_{slot}$), and the number of slots per subframe ($N^{subframe,u}_{slot}$) according to an SCS configuration μ in the NCP case.

TABLE 1

| SCS ($15*2^u$) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS ($15*2^u$) | $N^{slot}_{symb}$ | $N^{frame, u}_{slot}$ | $N^{subframe, u}_{slot}$ |
|---|---|---|---|
| 60 kHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
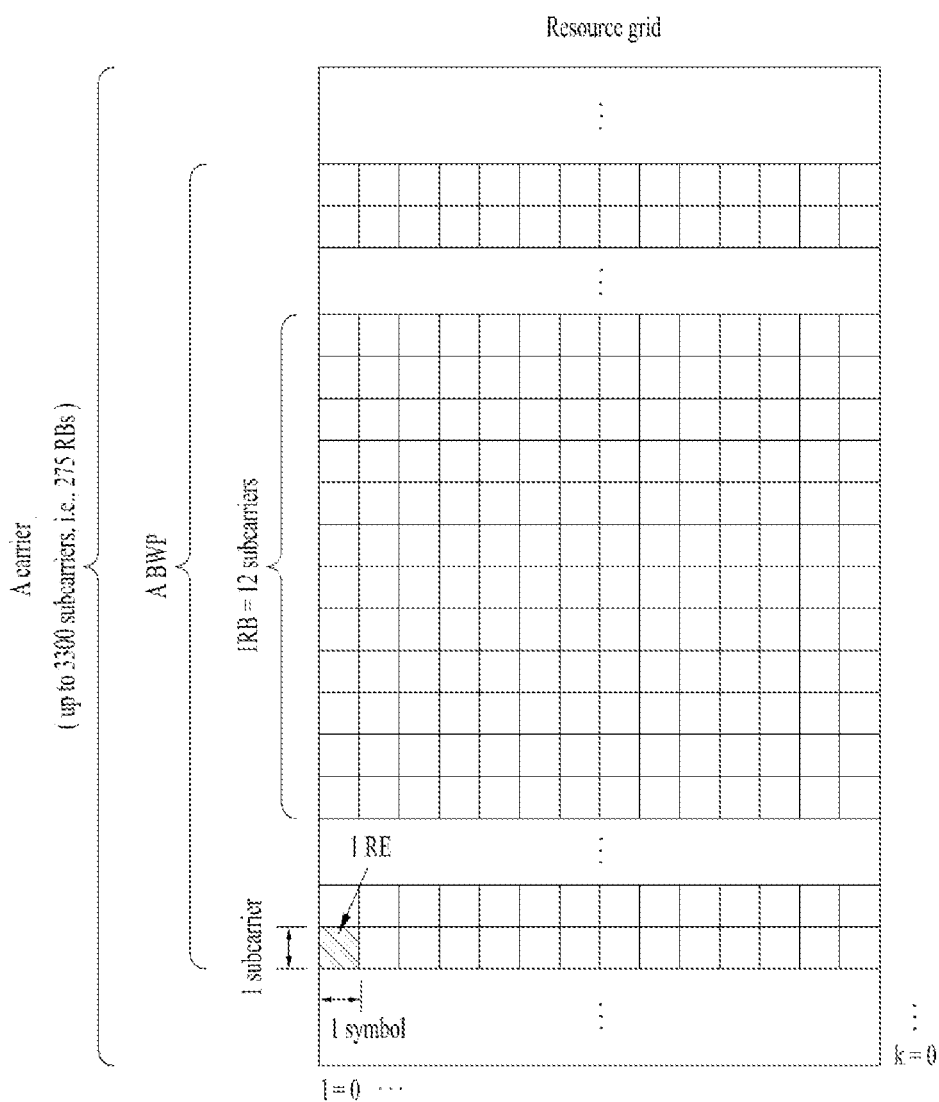
FIG. 5 illustrates the slot structure of an NR frame.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
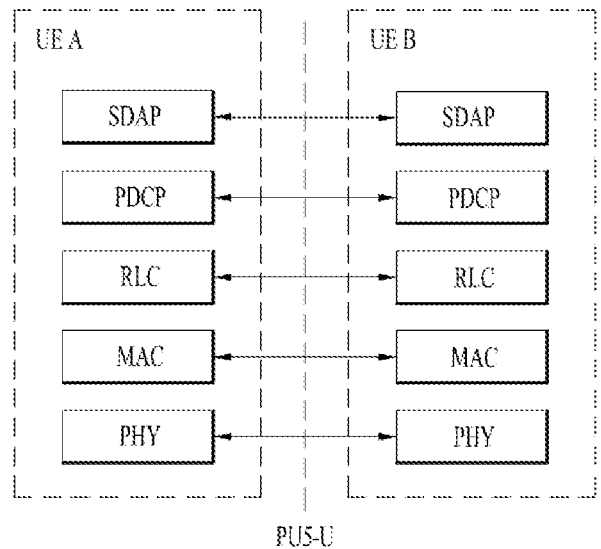
FIG. 6 illustrates a radio protocol architecture for SL communication.
Figure 6:
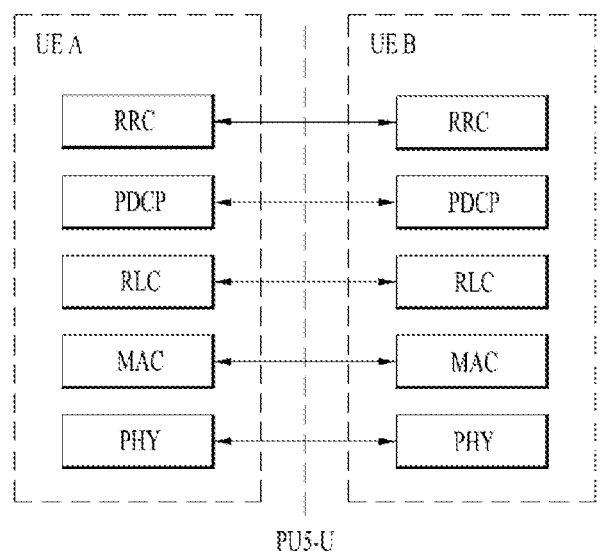

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
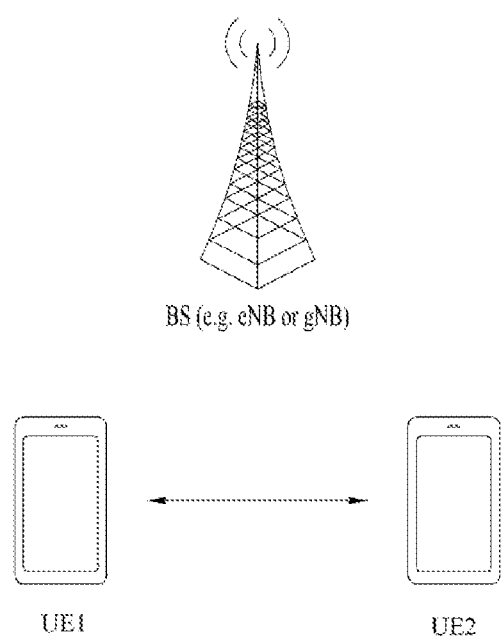
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
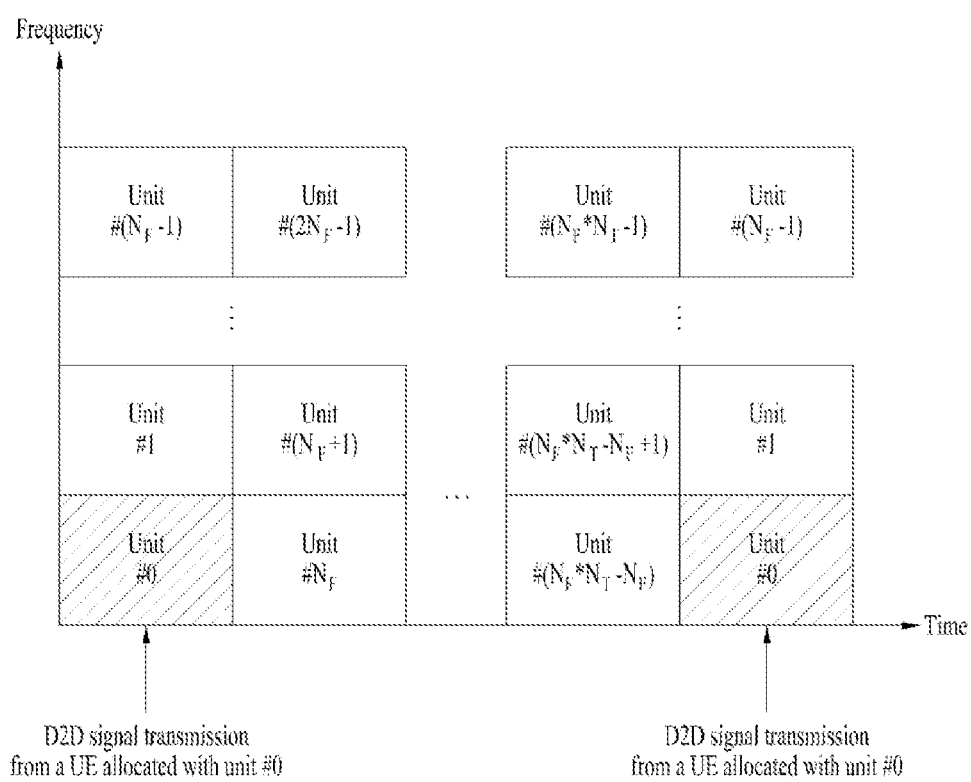
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
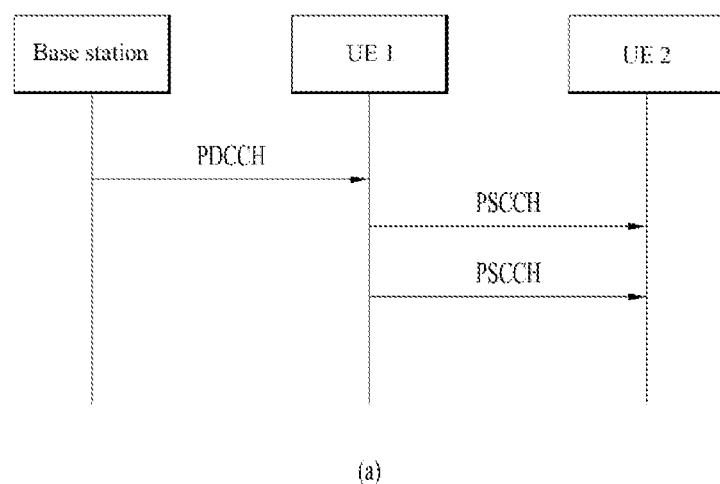
FIG. 9 illustrates a procedure in which UEs perform V2X or SL communication according to a transmission mode
Figure 9:
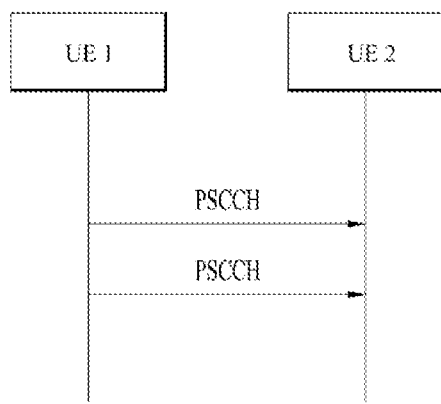

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1>0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICO. The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Figure 10:
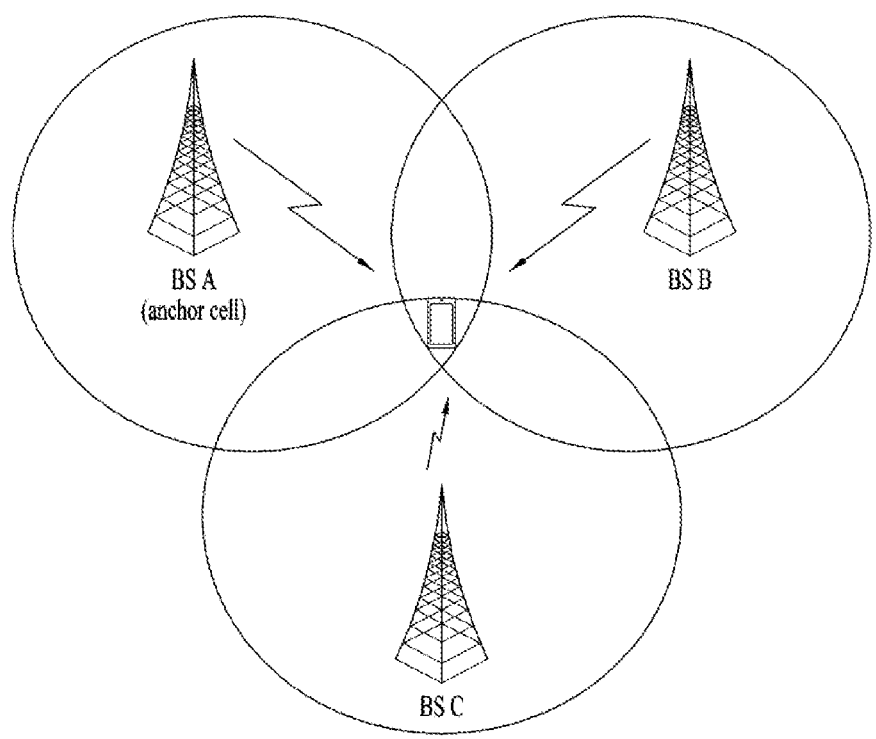
FIG. 10 illustrates an Observed Time Difference Of Arrival (OTDOA) positioning method to which the present disclosure is applicable.

FIG. 10 is a diagram illustrating an OTDOA positioning method according to an embodiment of the present disclosure.

In the OTDOA positioning method, a UE utilizes measurement timings of DL signals received from multiple TPs including an eNB, an ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell. That is, the RSTD may be calculated as a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the times of arrival (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 1]

Here, 'c' is the speed of light, {xt, yt} is the (unknown) coordinates of the target UE, {xi, yi} is the coordinates of a (known) TP, and {x1, y1} is the coordinates of a reference TP (or another TP). (Ti–T1) is a transmission time offset between the two TPs, which may be referred to as "real time difference" (RTD), and 'ni' and 'n1' may represent values related to UE TOA measurement errors.

E-CID (Enhanced Cell ID): In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA Rx-Tx time difference, GSM EDGE random access network (GERAN)/WLAN RSSI, UTRAN common pilot channel (CPICH) received signal code power (RSCP), and UTRAN CPICH Ec/Io.

E-UTRAN measurements: ng-eNB Rx-Tx time difference, timing advance (TADV), and angle of arrival (AoA).

TADVs may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

On the other hand, an AoA may be used to measure the direction of the UE. The AoA may be defined as an estimated angle of the UE with respect to the location of the UE counterclockwise from a BS/TP. A geographical reference direction may be north. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

UTDOA (Uplink Time Difference of Arrival): UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

Periodic Sidelink PRS Resource Management

In the legacy NR-V2X system, the provision of sidelink positioning services between UEs is not considered. Thus, currently there is no technology for configuring and operating/managing sidelink positioning reference signal (SL-PRS) resources for ranging between UEs. For conventional NR positioning, DL PRS transmission may be performed based on preconfigured DL-PRS resource configurations of the BS, and UL transmission for positioning may be performed based on preconfigured UL-PRS resource configurations of the UE. That is, DL-PRS resources and UL-PRS resources may be configured and managed independently of each other. However, considering that sidelink positioning between various UEs needs to be supported on the same SL-PRS resource, an effective SL-PRS resource management method in consideration of the characteristics of positioning may be required.

Hereinafter, methods for periodic SL-PRS resource configurations and SL-PRS resource managements will be described to efficiently support sidelink positioning between UEs in NR-V2X systems. First, the definitions of terms used herein will be described.

UE: The term UE may include a vehicle, robot, mobile device, device equipped with V2X modules, road side unit (RSU), IoT device, etc.

Sidelink positioning: The sidelink positioning may include sidelink round trip time (SL-RTT) positioning, sidelink time difference of arrival (SL-TDoA) positioning, sidelink angle of arrival (SL-AoA) positioning, sidelink arrival of departure (SL-AoD) positioning, etc.

Positioning signaling or positioning signal: The positioning signaling or positioning signal may refer to resource scheduling required for positioning and signaling of information on positioning resources, which may include scheduling information on a PRS such as positioning types (RTT, TDoA, AOA, etc.), PQI, absolute position reliability, channel resource allocation, and transmission parameters (e.g., channel coding rate, modulation coefficient, PRS transmission bandwidth, channel resource pattern for PRS transmission, PRS pattern, etc.).

V2X slot: The V2X slot refers to a logical slot used for transmission of V2X messages/packets in the legacy NR-V2X system.

SL-PRS resource: The SL-PRS resource consists of one or more REs.

SL-PRS resource set: The SL-PRS resource set consists of one or more SL-PRS resources.

SL-PRS slot: The SL-PRS slot is distinct from the V2X slot and refers to a logical slot used for SL-PRS transmission.

SL-PRS slot group: The SL-PRS slot group consists of one or more consecutive SL-PRS slots.

Transmitting UE (Tx-UE: transmit UE): The transmitting UE may include: ① when SL-RTT positioning is performed, a UE that requests a neighboring UE to participate in the SL-RTT positioning and transmits an SL-PRS (Tx) (or request SL-PRS) to the neighboring UE for ranging; ② when on-demand SL-TDoA positioning is performed, a UE that transmits an SL-PRS (Tx) to request a neighboring UE to participate in the SL-TDoA positioning; and ③ when broadcast SL-TDoA positioning is performed, a UE that transmits an SL-PRS to a neighboring UE.

Receiving UE (Rx-UE: receive UE): The receiving UE may include: ① when SL-RTT positioning is performed, a UE that receives a request to participate in the SL-RTT positioning from a neighboring UE and transmits an SL-PRS (Rx) (or response SL-PRS) in response to an SL-PRS (Tx) received from the neighboring UE (requesting to participate in the SL-RTT positioning) for ranging; and ② when on-demand SL-TDoA positioning is performed, a UE that receives a request to participate in the SL-TDoA positioning from a neighboring UE and transmits an SL-PRS (Rx) in response to an SL-PRS (Tx) received from the neighboring UE (requesting to participate in the SL-TDoA positioning)

Hereinafter, methods of managing periodic SL-PRS resources in an SL-PRS slot group or between SL-PRS slot groups to efficiently support sidelink positioning between UEs in the NR-V2X system will be described based on the above terms.

First, a structure in which an SL-PRS is transmitted by inserting an SL-PRS slot group distinct from the current V2X slot (or without transmitting V2X messages/packets in a V2X slot group composed of one or more V2X slots) will be described in order to effectively support various sidelink positioning in the NR-V2X system.

Figure 11:
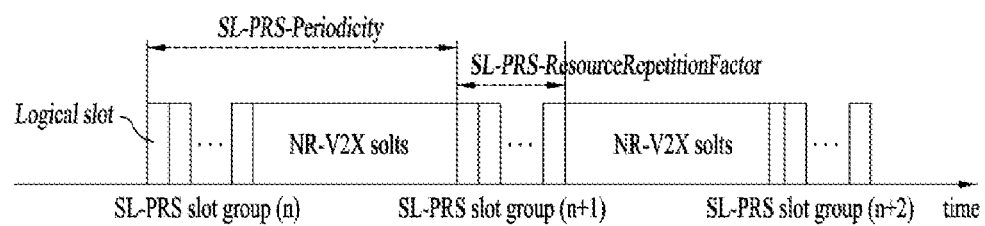
FIG. 11 illustrates SL-PRS slot groups periodically configured in NR-V2X systems.

FIG. 11 illustrates SL-PRS slot groups periodically configured in the NR-V2X system.

Referring to FIG. 11, each SL-PRS slot group may be configured by continuously arranging one or more SL-PRS slots. The variables (RRC parameters or information elements) SL-PRS-Periodicity and SL-PRS-ResourceRepetitionFactor may indicate or represent a logical slot periodicity with which the SL-PRS slot group is allocated and the number of SL-PRS slots included in the SL-PRS slot group, respectively. In addition, SL-PRS slot group (n) denotes an n-th SL-PRS slot group.

In this case, SL-PRS-Periodicity and SL-PRS-ResourceRepetitionFactor may be determined by the BS/network/LMF, preconfigured, or predefined. In addition, SL-PRS resources included in each SL-PRS slot may also be determined by the BS/network/LMF, preconfigured, or predefined.

After the configurations of SL-PRS slot groups and SL-PRS resources in each slot are determined, the Tx UE may select SL-PRS resources between SL-PRS slot groups or within an SL-PRS slot group to perform SL-RTT positioning and SL-TDoA positioning.

Hereinafter, methods of operating/managing SL-PRS resources between slots to efficiently exchange an SL-PRS (Tx) and an SL-PRS (Rx) between a Tx UE and an Rx UE will be described based on embodiments for various SL-PRS slot group configurations.

An SL-PRS (Tx) represents an SL-PRS transmitted by the Tx UE to one or more neighboring Rx UEs, and an SL-PRS (Rx) represents an SL-PRS transmitted from the Rx UE to the Tx UE in response to the received SL-PRS (Tx). For convenience of description, the SL-PRS (Tx) is defined as a request PRS, and the SL-PRS (Rx) is defined as a response PRS.

Figure 12:
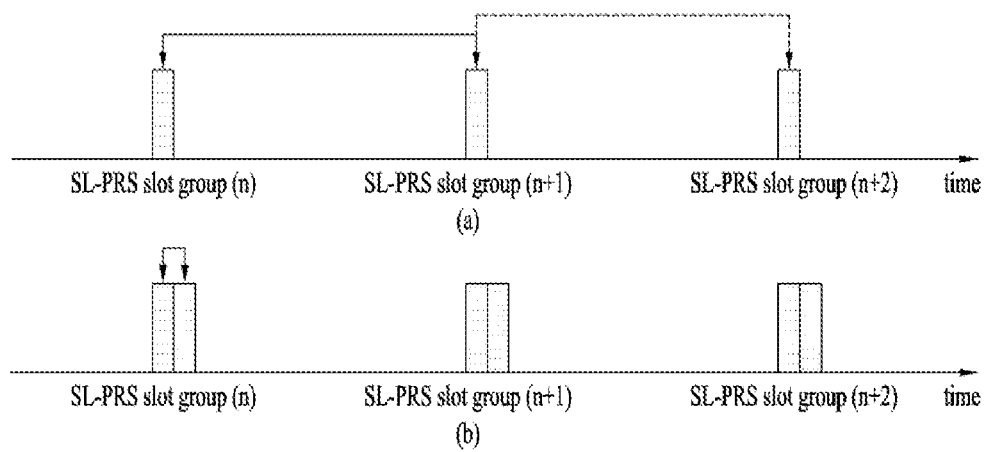
FIG. 12 is a diagram for explaining a method of transmitting a request PRS and a response PRS.

FIG. 12 is a diagram for explaining a method of transmitting a request PRS and a response PRS.

Referring to FIG. 12, the request PRS and response PRS may be transmitted in different SL-PRS slot groups or within the same SL-PRS slot group. When the request PRS and response PRS are transmitted within the same SL-PRS slot group, the request PRS and response PRS may be transmitted in contiguous SL-PRS slots or non-contiguous SL-PRS slots.

Referring to FIG. 12(*a*), the request PRS and response PRS may be transmitted in different SL-PRS slot groups, and SL-PRS-ResourceRepetitionFactor may be set to 1. In addition, SL-PRS slot group (n) and SL-PRS slot group (n+1) may be paired for transmission of the request PRS and response PRS. In this case, the request PRS may be transmitted in SL-PRS slot group (n), and the response PRS may be transmitted in SL-PRS slot group (n+1) in response to the request PRS.

Alternatively, SL-PRS slot group (n+1) and SL-PRS slot group (n+2) may be paired for transmission of the request PRS and response PRS. In this case, the request PRS may be transmitted in SL-PRS slot group (n+1), and the response PRS may be transmitted in SL-PRS slot group (n+2).

When the request PRS and response PRS are transmitted in different SL-PRS slot groups, it may increase the overall efficiency of use of SL-PRS resources, but an increase in the interval between paired SL-PRS slot groups may cause a delay in SL-RTT positioning. Hereinafter, various pairing methods based on the variable SL-PRS-ResourceRepetitionFactor and features thereof will be described.

Referring to FIG. 12(*b*), when SL-PRS-ResourceRepetitionFactor=2, the request PRS and response PRS may be transmitted in different SL-PRS slot groups. The first SL-PRS slot and the second SL-PRS slot of SL-PRS slot group (n) may be paired for transmission of the request PRS and response PRS. In this case, the request PRS may be transmitted in the first SL-PRS slot, and the response PRS may be transmitted in the second SL-PRS slot.

When SL-PRS-ResourceRepetitionFactor=2 or higher, the request PRS and response PRS may be transmitted in the same SL-PRS slot group. In this case, low-latency SL-RTT positioning may be achieved. However, the overall efficiency of use of SL-PRS resources and the overall flexibility in management of SL-RTT positioning may be reduced. Hereinafter, various pairing methods based on the values of the following variables: SL-PRS-ResourceRepetitionFactor or SL-PRS slot group jump and features thereof will be described.

Figure 13:
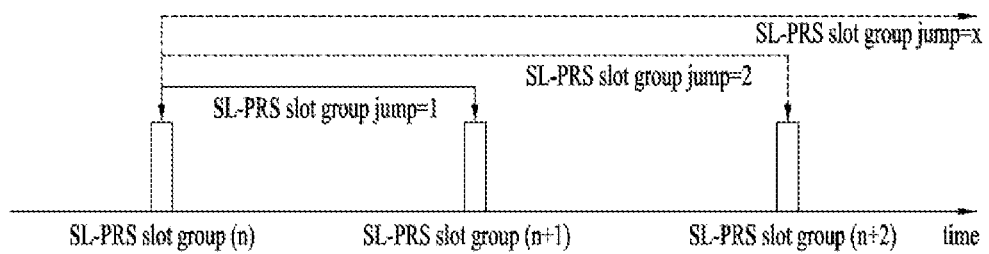
FIG. 13 is a diagram for explaining a method of transmitting and receiving a request PRS and a response PRS based on SL-PRS-ResourceRepetitionFactor and/or SL-PRS slot group jump.

FIG. 13 is a diagram for explaining a method of transmitting and receiving a request PRS and a response PRS based on SL-PRS-ResourceRepetitionFactor and/or SL-PRS slot group jump.

For pairing between an SL-PRS slot group for transmission of the request PRS and an SL-PRS slot group for transmission of the response PRS when the request PRS and response PRS are transmitted in different SL-PRS slot groups, 1) two contiguous SL-PRS slot groups may be paired, or 2) non-contiguous SL-PRS slot groups may be paired. In the following description, it is assumed that ResourceRepetitionFactor=1.

Referring to FIG. 13, an SL-PRS slot group for transmission of the request PRS and an SL-PRS slot group for transmission of the response PRS may be paired based on the variable SL-PRS slot group jump (or distance between the SL-PRS slot groups).

When SL-PRS slot group jump=1, two contiguous SL-PRS slot groups may be paired. For example, SL-PRS slot group (n) may be paired with SL-PRS slot group (n+1), and SL-PRS slot group (n+1) may be paired with SL-PRS slot group (n+2). When SL-PRS slot group jump=2, two SL-PRS slot groups separated by an interval of 2 may be paired. For example, SL-PRS slot group (n) may be paired with SL-PRS slot group (n+2), and SL-PRS slot group (n+1) may be paired with SL-PRS slot group (n+3).

That is, when SL-PRS slot group jump=X, two SL-PRS slot groups separated by an interval of X may be paired. For example, SL-PRS slot group (n) may be paired with SL-PRS slot group (n+X), and SL-PRS slot group (n+1) may be paired with SL-PRS slot group (n+X+1).

In this case, the value of SL-PRS slot group jump may be adjusted or configured for distributed congestion control (DCC) operation for sidelink positioning. For example, congestion that may be caused by an increase in the number of UEs participating in positioning may be reduced by increasing the value of the variable SL-PRS slot group jump.

Alternatively, when the Rx UE finally selects one SL-PRS slot group from a plurality of candidate SL-PRS slot groups and transmits an SL-PRS (Rx) in the selected SL-PRS slot group, the following advantages may be provided, compared to the above-described case where an SL-PRS slot group is preconfigured for SL-PRS (Rx) transmission.

First, when the Rx UE is participating in multiple SL-RTT positioning, the Rx UE may flexibly select an SL-PRS slot group targeted for SL-PRS (Rx) transmission to avoid half-duplex and power sharing problems. The half-duplex and power distribution problems may be defined as follows.

Half-duplex problem: When the UE is required to perform the following two operations in the same SL-PRS slot group: receiving the request PRS (when the UE operates as the Tx UE in another SL-RTT positioning procedure, that is, when the UE waits for the response PRS as a response after transmitting the request PRS); and transmitting the response PRS (when the UE operates as the Rx UE in another SL-RTT positioning procedure, that is, when the UE transmits the SL-PRS (Rx) as a response after receiving the request PRS (or SL-PRS)), the UE may perform only one operation due to the limitation of the number of antennas. As a result, the unacceptable operation may be regarded as data loss. The limited UE operation is called the half-duplex problem.

Power distribution problem: When the UE is required to perform the following two operations: transmitting the request PRS (when the UE transmits the request PRS as the Tx UE in another SL-RTT positioning procedure); and transmitting the response PRS (when the UE operates as the Rx UE in another SL-RTT positioning procedure, that is, when the UE transmits the response PRS as a response after receiving the request PRS), the UE may be allowed to perform only one operation due to the maximum transmit power limitation, or the UE may perform multiple operations based on power distribution operations. The above operations may cause data loss, network coverage reduction, and/or reception performance degradation due to signal-to-interference-plus-noise ratio (SINR) reduction. The limited UE operation is referred to as the power distribution problem.

Alternatively, when it is not easy to reserve an SL-PRS slot group for transmission of the response PRS due to a high channel congestion level, or when the SL-PRS slot group that the UE desires to use is already in use or reserved, the UE may perform resource reservation and transmit the response PRS in another candidate SL-PRS slot group.

SL-PRS slot group jump may be determined by the UE/BS/network and then signaled in first stage SCI and/or second stage SCI on a PSCCH and/or over a PSSCH. Alternatively, SL-PRS slot group jump may be preconfigured. Alternatively, the default value of SL-PRS slot group jump may be set to 1 in advance.

When the request PRS and response PRS are transmitted in different SL-PRS slot groups, an SL-PRS slot group for transmission of the request PRS may be paired with one or more candidate SL-PRS slot groups for transmission of the response PRS. In this case, the Rx UE may directly select a candidate SL-PRS slot group to be used for transmission of the response PRS from among the one or more candidate SL-PRS slot groups and then provide the Tx UE with information about the selected candidate SL-PRS slot group. The number and location of candidate SL-PRS slot groups for transmission of the response PRS may be determined by the (Rx) UE/BS/network and then signaled in first stage SCI and/or second stage SCI on a PSCCH and/or over a PSSCH. Alternatively, the number and location of candidate SL-PRS slot groups may be preconfigured.

For example, referring to FIG. 13, SL-PRS slot group (n) for transmission of the request PRS may be paired with SL-PRS slot group (n+1) and SL-PRS slot group (n+2), which are candidate SL-PRS slot groups for transmission of the response PRS.

The Rx UE may select at least one SL-PRS slot group from among one or more SL-PRS slot groups paired with an SL-PRS slot group in which the request PRS is received, based on the degree of use of the SL-PRS (or response PRS) in each SL-PRS slot group and/or other positioning procedures in which the Rx UE participate. In this case, the finally selected SL-PRS slot group for transmission of the response PRS may be signaled to the Tx UE that has transmitted the request PRS in first stage SCI and/or second stage SCI on a PSCCH and/or over a PSSCH.

Each UE (Tx UE and/or Rx UE) may determine whether to transmit/receive the request PRS and response PRS in the same SL-PRS slot, depending on the degree of use of SL-PRS resources within an SL-PRS slot (or SL-PRS slot group) and/or the configuration/allocation of SL-PRS resources within the SL-PRS slot. That is, when the UE operates as the Tx UE, the UE may receive the response PRS and transmit the request PRS (or SL-PRS (Tx)) in the same SL-PRS slot. When the UE operates as the Rx UE, the UE may receive the request PRS and transmit the SL-PRS (Rx) in the same SL-PRS slot. Accordingly, the half-duplex problem may be avoided.

Specifically, when at least one of the following conditions is satisfied, each UE (Tx UE and/or Rx UE) may transmit and receive the request PRS and response PRS in the same SL-PRS slot.

First condition: When the remaining SL-PRS resources except for SL-PRS resources preconfigured for transmission of the response PRS in each SL-PRS slot group are sufficient to transmit the request PRS, each UE may transmit and receive the request PRS and response PRS in the same SL-PRS slot. In the first condition, the use/reservation of SL-PRS resources for transmitting the response PRS in each SL-PRS slot group may have a higher priority than the use/reservation of SL-PRS resources for transmitting the request PRS. When the Tx UE attempts to receive the response PRS and transmit the request PRS in the same SL-PRS slot, information about SL-PRS resources reserved/occupied for transmission of the response PRS in a corresponding SL-PRS slot group may be obtained from the request PRS transmitted in a previous SL-PRS slot group and signaling information on the request PRS.

Alternatively, when the Rx UE attempts to transmit the response PRS (or SL-PRS (Rx)) and receive the request PRS (or SL-PRS (Tx)) in the same SL-PRS slot, information on SL-PRS resources reserved/occupied for the request PRS in a corresponding SL-PRS slot group may be obtained from signaling information including the SL-PRS slot reservation/configuration for transmission of the request PRS.

Second condition: When an SL-PRS resource for transmitting and receiving the request PRS and an SL-PRS resource for transmitting and receiving the response PRS are sufficiently separated by a time of X within the same slot (or the same SL-PRS slot group), transmission of the request PRS and reception of the response PRS (or transmission of the response PRS and reception of the request PRS) may be allowed within the same slot. In this case, the separation time X may correspond to the time required for the antenna of the UE to switch from the transmission mode to the reception mode or from the reception mode to the transmission mode. In the NR-V2X system, the separation time X may be preconfigured to have a length of at least one OFDM symbol.

Hereinafter, it will be described how each UE operates when the above-described first condition and/or second condition is satisfied.

When the first condition and/or the second condition is satisfied, the Tx UE may transmit the request PRS in every SL-PRS slot (or every SL-PRS slot group) while receiving the response PRS, and the Rx UE may receive the request PRS in every SL-PRS slot (or every SL-PRS slot group) while transmitting the response PRS. Alternatively, when SL-PRS resources are configured/allocated in each OFDM symbol in block types, and when the time interval between resources for transmission of the request PRS and response PRS has a length of one or more OFDM symbols, the Rx UE or Tx UE may transmit and receive the request PRS and response PRS in the same SL-PRS slot. Alternatively, when the Tx UE (or Rx UE) participates in two or more different SL-RTT positioning procedures with neighboring UEs, the Tx UE (or Rx UE) may transmit and receive the request PRS and response PRS in the same SL-PRS slot.

When each UE (Tx UE and/or Rx UE) participates in two or more SL-RTT positioning procedures, the UE may transmit or receive at least two or more request PRSs in the same SL-PRS slot (or the same SL-PRS slot group) or transmit or receive at least two or more response PRSs in the same SL-PRS slot (or the same SL-PRS slot group).

Alternatively, different Tx UEs may transmit the request PRS in the same or different SL-PRS slot groups, and Rx UEs related to the Tx UEs may also transmit the response PRS in different SL-PRS slot groups. For example, a Tx UE and an Rx UE may transmit the request PRS and response PRS in SL-PRS slot group (n) and SL-PRS slot group (n+1), which are paired with each other, and another Tx UE and another Rx UE may transmit the request PRS and response PRS in SL-PRS slot group (n+1) and SL-PRS slot group (n+2), which are paired with each other. In other words, the Rx UE may receive a first request PRS from a first Tx UE in SL-PRS slot group (n). In addition, the Rx UE may receive a second request PRS from a second Tx UE while transmitting a first response PRS in SL-PRS slot group (n+1) in response to the first request PRS.

In the following cases, each UE (Tx UE and/or Rx UE) may not transmit/receive the request PRS and response PRS in the same SL-PRS slot (or the same SL-PRS slot group).

Specifically, when two contiguous SL-PRS slot groups are not paired, or when the remaining SL-PRS resources except for SL-PRS resources for transmission of the response PRS in each SL-PRS slot group are not sufficient to transmit the request PRS although two contiguous SL-PRS slot groups are paired (for example, referring to FIG. 12(a), when SL-PRS slot group (n) is paired with SL-PRS slot group (n+1), and when SL-PRS slot group (n+2) is SL-PRS slot group (n+3)), each UE may not transmit and receive the request PRS and response PRS in the same SL-PRS slot.

When an SL-PRS resource for transmitting and receiving the request PRS and an SL-PRS resource for transmitting and receiving the response PRS are not sufficiently separated within the same SL-PRS slot (or the same SL-PRS slot group) (for example, when the separation distance X is less than the length of one OFDM symbol), the UE may not transmit the request PRS and receive the response PRS in the same SL-PRS slot or may not receive the request PRS and transmit the response PRS in the same SL-PRS slot. Therefore, the UE needs to transmit and receive the request PRS and response PRS in different SL-PRS slots.

When the request PRS and response PRS are incapable of being transmitted and received within the same SL-PRS slot (or the same SL-PRS slot group), the Tx UE may transmit the request PRS in SL-PRS slot group (n), SL-PRS slot group (n+2), SL-PRS slot group (n+4), etc., and the Rx UE may transmit the response PRS in SL-PRS slot group (n+1), SL-PRS slot group (n+3), SL-PRS slot group (n+5), etc. Alternatively, when SL-PRS resources are configured/allocated over a plurality of OFDM symbols as in a staggered comb type, the Tx UE and/or Rx UE may not transmit and receive the request PRS and response PRS in the same SL-PRS slot (or the same SL-PRS slot group). Alternatively, if the Tx UE and/or Rx UE participate in two or more different SL-RTT positioning procedures with neighboring UEs, the Tx UE and/or Rx UE may transmit the request PRS and receive the response PRS in different SL-PRS slots (or different SL-PRS slot groups), or may receive the request PRS and transmit the response PRS in different SL-PRS slots (or different SL-PRS slot groups).

Figure 14:
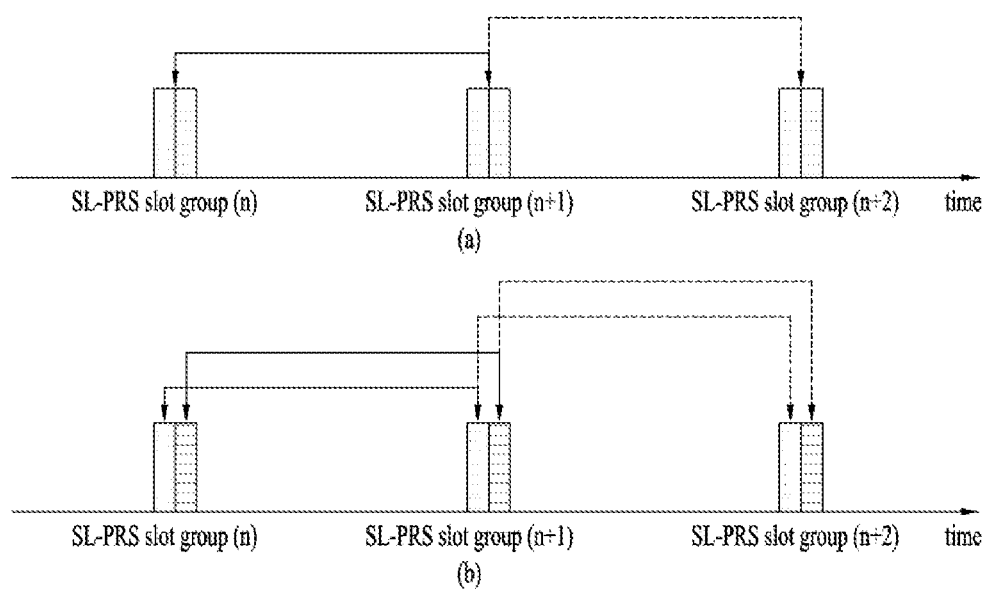
FIG. 14 is a diagram for explaining an SL-PRS resource management method based on SL-PRS-ResourceRepetitionFactor.

FIG. 14 is a diagram for explaining an SL-PRS resource management method based on SL-PRS-ResourceRepetitionFactor.

SL-PRS slot groups may be paired in various ways when SL-PRS slot group jump=1 and SL-PRS-ResourceRepetitionFactor=2.

Referring to FIG. 14(a), SL-PRS slot group (n) may be paired with SL-PRS slot group (n+1), and SL-PRS slot group (n+1) may be paired with SL-PRS slot group (n+2). In this case, the Tx UE and/or Rx UE may perform transmission of the request PRS and/or transmission of the response PRS as follows.

The Tx UE may transmit the request PRS in an arbitrary SL-PRS slot of an SL-PRS slot group. The Rx UE may transmit the response PRS in an SL-PRS slot randomly selected in an SL-PRS slot group paired with the SL-PRS slot group in which the request PRS is transmitted. Alternatively, if one or more response PRSs are transmitted in response to reception of the request PRS (for example, if the Rx UE receives two or more request PRSs or transmits a plurality of response PRSs in response to one request PRS), the Rx UE may transmit the response PRSs in multiple SL-PRS slots. For example, the Rx UE may transmit at least one response PRS in SL-PRS slot group (n+1) in response to the request PRS received in the first SL-PRS slot of SL-PRS slot group (n). In this case, the at least one response PRS may be distributed and transmitted over the first SL-PRS slot and the second SL-PRS slot of SL-PRS slot group (n+1).

Referring to FIG. 14(b), pairing between an SL-PRS slot for transmission of the request PRS and an SL-PRS slot for transmission of the response PRS within paired SL-PRS slot groups may be configured in advance.

Specifically, the SL-PRS slot for transmission of the request PRS and the SL-PRS slot for transmission of the response PRS may be configured to have the same location in the paired SL-PRS slot groups. For example, as shown in FIG. 14(b), the first SL-PRS slot of SL-PRS slot group (n) may be paired with the first SL-PRS slot of SL-PRS slot group (n+1). In this case, when the Rx UE receives the request PRS in the first SL-PRS slot of SL-PRS slot group (n), the Rx UE may transmit the response RPS in response to the request PRS in the first SL-PRS slot of SL-PRS slot group (n+1).

Alternatively, the SL-PRS slot for transmission of the request PRS and the SL-PRS slot for transmission of the response PRS may be configured to have different positions in the paired SL-PRS slot groups. For example, the first SL-PRS slot of SL-PRS slot group (n) may be paired with the second SL-PRS slot of SL-PRS slot group (n+1). When the Rx UE receives the request PRS in the first SL-PRS slot of SL-PRS slot group (n), the Rx UE may transmit the response RPS in response to the request PRS in the second SL-PRS slot of the SL-PRS slot group (n+1). The relationship between the location of the SL-PRS slot for transmission of the request PRS and the location of the SL-PRS slot for transmission of the response PRS may be determined by the UE/BS/network and then signaled in first stage SCI and/or second stage SCI on a PSCCH and/or over a PSSCH. Alternatively, the relationship may be preconfigured.

Figure 15:
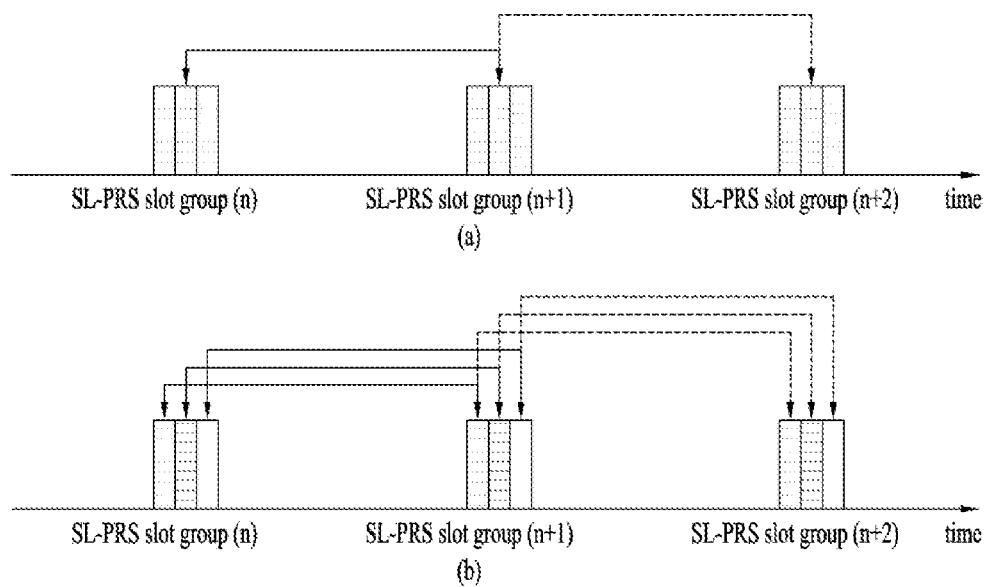
FIGS. 15, 16 and 17 are diagrams for explaining pairing relationships between SL-PRS slots based on SL-PRS slot group jump and SL-PRS-ResourceRepetitionFactor.
Figure 16:
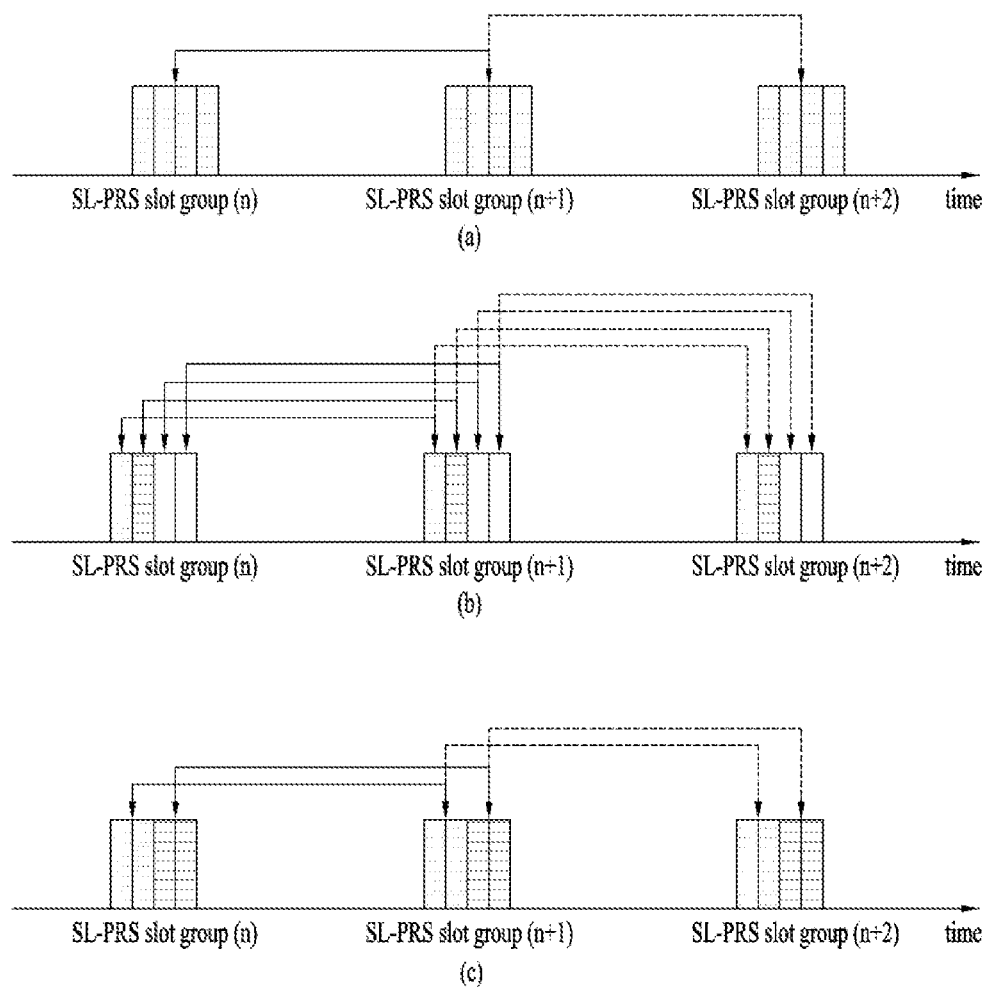
Figure 17:
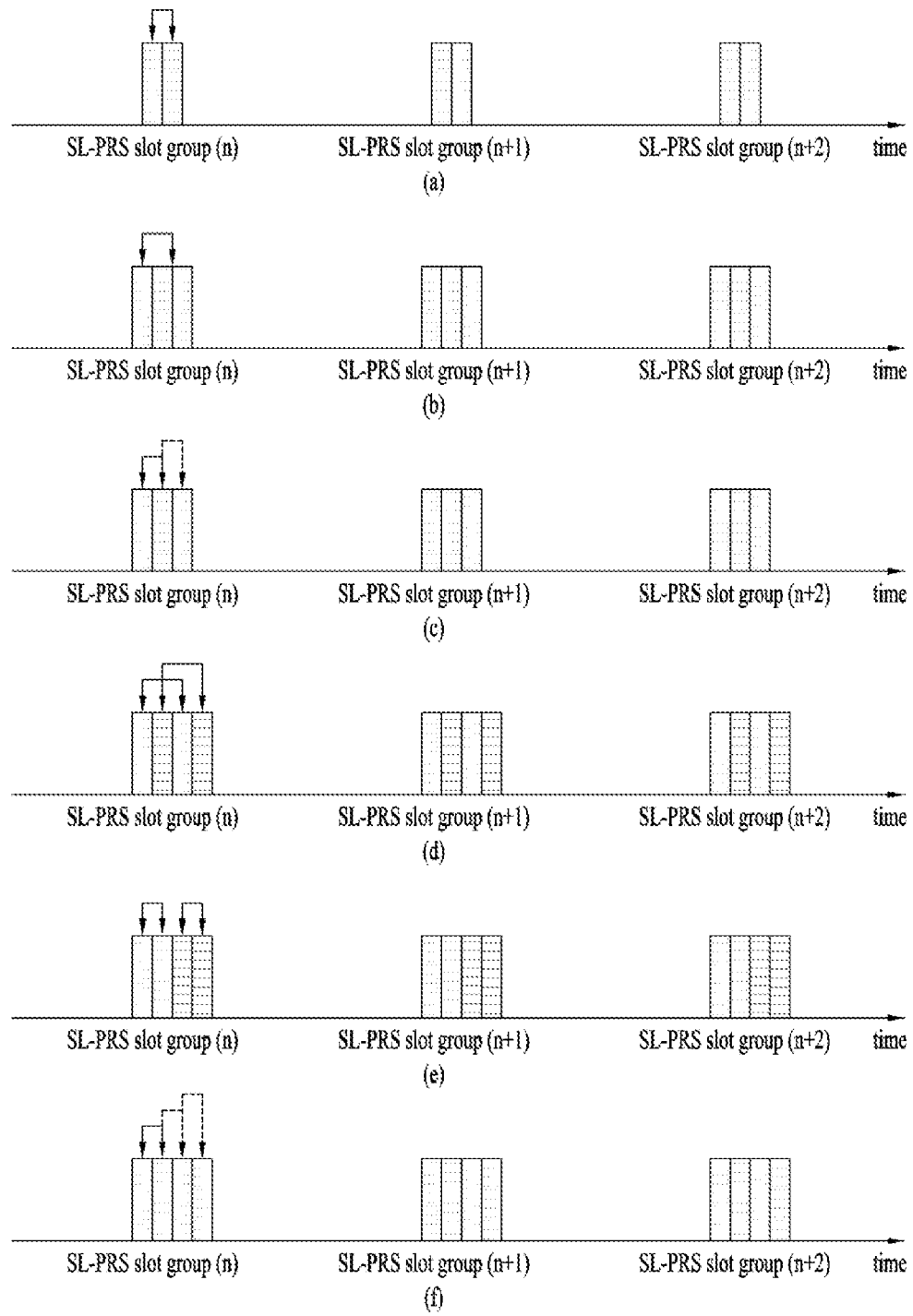

FIGS. 15, 16 and 17 are diagrams for explaining pairing relationships between SL-PRS slots based on SL-PRS slot group jump and SL-PRS-ResourceRepetitionFactor.

Referring to FIG. 15, SL-PRS slot groups may be paired based on SL-PRS slot group jump set to 1 and SL-PRS-ResourceRepetitionFactor set to 3.

As shown in FIG. 15(a), transmission of the request PRS and transmission of the response PRS in paired SL-PRS slot groups may be performed as a default operation. In other words, as the default operation, the request PRS and response PRS may be transmitted and received in an SL-PRS slot randomly selected in an SL-PRS slot group based on a pairing relationship between SL-PRS slot groups.

Referring to FIG. 15(b), the request PRS and response PRS may be transmitted in an SL-PRS slot determined based on a pairing relationship between SL-PRS slot groups and a pairing relationship between SL-PRS slots. For example, SL-PRS slot group (n) may be paired with SL-PRS slot group (n+1), the first SL-PRS slot of SL-PRS slot group (n) may be paired with the first SL-PRS slot of SL-PRS slot group (n+1), the second SL-PRS slot may be SL-PRS slot group (n) may be paired with the second SL-PRS slot of SL-PRS slot group (n+1), and the third SL-PRS slot of SL-PRS slot group (n) may be paired with the third SL-PRS slot of SL-PRS slot group (n+1).

Referring to FIG. 16, SL-PRS slot groups may be paired based on SL-PRS slot group jump set to 1 and SL-PRS-ResourceRepetitionFactor set to 4.

As shown in FIG. 16 (a), as a default operation, the request PRS and response PRS may be transmitted and received in an SL-PRS slot randomly selected in an SL-PRS slot group based on a pairing relationship between SL-PRS slot groups. For example, when the Rx UE receives the request PRS in SL-PRS slot group (n), the Rx UE may transmit the response PRS in an SL-PRS slot randomly selected in SL-PRS slot group (n+1), which is paired with SL-PRS slot group (n).

Referring to FIG. 16(*b*), the request PRS and response PRS may be transmitted in an SL-PRS slot determined based on a pairing relationship between SL-PRS slot groups and a pairing relationship between SL-PRS slots.

For example, SL-PRS slot group (n) may be paired with SL-PRS slot group (n+1), the first SL-PRS slot of SL-PRS slot group (n) may be paired with the first SL-PRS slot of SL-PRS slot group (n+1), the second SL-PRS slot of SL-PRS slot group (n) may be paired with the second SL-PRS slot of SL-PRS slot group (n+1), the third SL-PRS slot of SL-PRS slot group (n) may be paired with the third SL-PRS slot of SL-PRS slot group (n+1), and the fourth SL-PRS slot of SL-PRS slot group (n) may be paired with the fourth SL-PRS slot of SL-PRS slot group (n+1). In other words, the Rx UE may determine the locations of an SL-PRS slot and SL-PRS slot group for transmitting the response PRS, depending or based on the locations of an SL-PRS slot of SL-PRS slot group (n) in which the request PRS is received Referring to FIG. 16(*c*), the request PRS and response PRS may be transmitted and received in an SL-PRS slot selected based on the locations of an SL-PRS slot group and an SL-PRS slot.

The number of SL-PRS slots constituting an SL-PRS slot subgroup may be determined by the UE/BS/network and then signaled in first stage SCI and/or second stage SCI on a PSCCH and/or over a PSSCH. Alternatively, the number of SL-PRS slots may be preconfigured Specifically, an SL-PRS slot group may include at least two SL-PRS slot subgroups each consisting of at least two SL-PRS slots. SL-PRS slot groups may be paired with each other, and SL-PRS slot subgroups may also be paired with each other. In this case, the Rx UE may determine an SL-PRS slot group and an SL-PRS slot subgroup based on the locations of an SL-PRS slot group and an SL-PRS slot subgroup in which the request PRS is received. Then, the Rx UE may transmit the response PRS in response to the request PRS in an SL-PRS slot randomly selected in the determined SL-PRS slot subgroup. The number and/or pairing relationship of SL-PRS slots included in the SL-PRS slot subgroup may be determined by the UE/BS/network and then signaled in first stage SCI and/or second stage SCI on a PSCCH and/or over a PSSCH. Alternatively, the number and/or pairing relationship of SL-PRS slots may be preconfigured.

The location of the SL-PRS slot subgroup in which the response PRS is transmitted may be related to the location of the SL-PRS slot subgroup in which the request PRS is received. For example, when the Rx UE receives the request PRS in the first SL-PRS slot subgroup of SL-PRS slot group (n), the Rx UE may transmit the response PRS in the first SL-PRS slot subgroup of SL-PRS slot group (n+1).

Alternatively, the location of the SL-PRS slot subgroup in which the response PRS is transmitted may intersect with the location of the SL-PRS slot subgroup in which the request PRS is received. For example, when the Rx UE receives the request PRS in the first SL-PRS slot subgroup of SL-PRS slot group (n), the Rx UE may transmit the response PRS in the second SL-PRS slot subgroup of SL-PRS slot group (n+1). Alternatively, when the Rx UE receives the request PRS in the second SL-PRS slot subgroup of SL-PRS slot group (n), the Rx UE may transmit the response PRS in the first SL-PRS slot subgroup of SL-PRS slot group (n+1).

The relationship between the location of the SL-PRS slot subgroup for transmission of the request PRS and the location of the SL-PRS slot subgroup for transmission of the response PRS may be determined by the UE/BS/network and then signaled in first stage SCI and/or second stage SCI on a PSCCH and/or over a PSSCH. Alternatively, the relationship may be preconfigured.

Referring to FIG. 17, an SL-PRS slot in which the response PRS is transmitted may be paired with an SL-PRS slot in which the request PRS is received within the same SL-PRS slot group where the request PRS is received in various ways, depending on the value of the variable SL-PRS-ResourceRepetitionFactor.

Referring to FIG. 17(*a*), SL-PRS slot group jump and SL-PRS-ResourceRepetitionFactor may be set to 1 and 2, respectively. The first SL-PRS slot and the second SL-PRS slot of one SL-PRS slot group may be paired with each other for transmission of the request PRS and response PRS. In this case, the request PRS may be transmitted in the first SL-PRS slot of the one SL-PRS slot group, and the response PRS may be transmitted in the second SL-PRS slot of the one SL-PRS slot group.

Pairing between consecutive slots in an SL-PRS slot group may be effectively applied to the following positioning services/systems.

First, the pairing between consecutive slots in an SL-PRS slot group may be effectively applied to positioning services/systems where the Tx UE requests to the Rx UE to rapidly transmit the response PRS (SL-PRS (Rx)) in response to the request PRS (SL-PRS (Tx)), compared to FIGS. 14 to 16.

The Rx UE may transmit the response PRS and positioning information, which corresponds to a measured/estimated Tx-Rx time difference (TRTD), in different slots rather than in the same slot. Specifically, the positioning information (TRTD) may be transmitted after the response PRS is transmitted. In the pairing method of FIG. 17(*a*), since the time required from reception of the request PRS to transmission of the response PRS is short, the positioning information (or TRTD) may be measured/estimated after the transmission of the response PRS and then transmitted in a slot different from that in which the response PRS is transmitted. The positioning information (TRTD) refers to measurement information transmitted from the Rx UE to the Tx UE in the SL-RTT positioning procedure, which represents the time difference.

Referring to FIG. 17(*b*), SL-PRS slot group jump and SL-PRS-ResourceRepetitionFactor may be set to 1 and 3, respectively. The first SL-PRS slot and the remaining SL-PRS slots (i.e., the second SL-PRS slot and the third SL-PRS slot) of an SL-PRS slot group may be paired with each other for transmission of the request PRS and response PRS. For example, when the request PRS is transmitted in the first SL-PRS slot, the response PRS may be transmitted in the remaining SL-PRS slots.

As shown in FIG. 17(*b*), when SL-PRS-ResourceRepetitionFactor is not a multiple of 2, the number of SL-PRS slots for transmission of the request PRS and the number of SL-PRS slots for transmission of the response PRS may not be equally distributed. In order to solve this problem, SL-PRS slots for transmission of the request PRS and response PRS may be efficiently distributed as follows. Specifically, the SL-PRS slots may be distributed between the request PRS and response PRS based on positioning methods based on the PRS. The positioning methods may include SL-RTT positioning, on-demand SL-TDoA positioning, and broadcast SL-TDoA positioning.

For the SL-RTT positioning, since the number of Rx UEs is greater than the number of Tx UEs to estimate the absolute location of a Tx UE, the number of SL-PRS slots distributed for the response PRS may be more than the number of SL-PRS slots distributed for the request PRS. For the on-demand SL-TDoA positioning and broadcast SL-TDoA positioning, the number SL-PRS slots distributed for the response PRS may be less than the number of SL-PRS slots distributed for the request PRS.

Similarly to FIG. 17(a), in FIG. 17(b), the Rx UE may transmit the response PRS and measured/estimated positioning information (or TRTD) in different slots in positioning services/systems where the response PRS needs to be quickly transmitted in response to the request PRS, which may be applied to positioning systems in which the positioning information (or TRTD) is transmitted after transmission of the response PRS.

Referring to FIG. 17(c), SL-PRS slot group jump and SL-PRS-ResourceRepetitionFactor may be set to 1 and 3, respectively. Specifically, in PRS slot group (n), the first SL-PRS slot may be paired with the second SL-PRS slot, and the second SL-PRS slot may be paired with the third SL-PRS slot. That is, two consecutive SL-PRS slots may be paired in the form of a sliding window unlike FIG. 17(b). In this case, SL-PRS resources may be used more efficiently than the pairing method in FIG. 17(b).

Similarly to FIG. 17(a), in FIG. 17(c), the Rx UE may transmit the response PRS and measured/estimated positioning information (or TRTD) in different slots in positioning services/systems where the response PRS needs to be quickly transmitted in response to the request PRS, which may be applied to positioning systems in which the positioning information (or TRTD) is transmitted after transmission of the response PRS.

Referring to FIG. 17(d), SL-PRS slot group jump and SL-PRS-ResourceRepetitionFactor may be set to 1 and 4, respectively. Specifically, non-contiguous SL-PRS slots within one SL-PRS slot group may be paired as SL-PRS slots for the request PRS and response PRS. For example, the response PRS transmitted in response to the request PRS transmitted in the first SL-PRS slot of SL-PRS slot group (n) may be transmitted in the third SL-PRS slot.

The pairing method between consecutive slots in an SL-PRS slot group of FIG. 17(d) may be effectively applied to positioning services/systems where the response PRS (SL-PRS (Rx)) needs to be quickly transmitted in response to the request PRS (or SL-PRS (Tx)). The Rx UE may transmit the response PRS and measured/estimated positioning information (TRTD) in the same slot or different slots, which may be applied to positioning systems in which the positioning information (TRTD) is transmitted before the response PRS or together with the response PRS. For example, in the pairing method of FIG. 17(d), since the time required from reception of the request PRS to transmission of the response PRS is long, the positioning information (TRTD) may be measured/estimated before the transmission of the SL-PRS (Rx) and then transmitted in the same slot together with the response PRS.

Referring to FIG. 17(e), SL-PRS slot group jump and SL-PRS-ResourceRepetitionFactor may be set to 1 and 4, respectively. In this case, contiguous SL-PRS slots within one SL-PRS slot group may be paired as SL-PRS slots for the request PRS and response PRS. For example, the response PRS transmitted in response to the request PRS transmitted in the first SL-PRS slot of SL-PRS slot group (n) may be transmitted in the second SL-PRS slot of SL-PRS slot group (n), which is contiguous with the first SL-PRS slot.

Similarly to FIG. 17(a), in FIG. 17(e), the Rx UE may transmit the response PRS and measured/estimated positioning information (or TRTD) in different slots in positioning services/systems where the response PRS needs to be quickly transmitted in response to the request PRS, which may be applied to positioning systems in which the positioning information (or TRTD) is transmitted after transmission of the response PRS.

Referring to FIG. 17(f), SL-PRS slot group jump and SL-PRS-ResourceRepetitionFactor may be set to 1 and 4, respectively. In this case, two consecutive SL-PRS slots may be paired in the form of a sliding window within one SL-PRS slot group unlike FIGS. 17(d) and 17(e). For example, in SL-PRS slot group (n), the first SL-PRS slot may be paired with the second SL-PRS slot, and the second SL-PRS slot may be paired with the third SL-PRS slot. In this case, SL-PRS resources may be used more efficiently compared to FIGS. 17(d) and 17(e).

Similarly to FIG. 17(a), in FIG. 17(f), the Rx UE may transmit the response PRS and measured/estimated positioning information (or TRTD) in different slots in positioning services/systems where the response PRS needs to be quickly transmitted in response to the request PRS, which may be applied to positioning systems in which the positioning information (or TRTD) is transmitted after transmission of the response PRS.

Hereinafter, methods of operating/managing SL-PRS resources for SL-TDoA positioning will be described.

In SL-TDoA positioning, SL-PRS resources may be operated/managed based on the above-described methods of operating/managing resources between the request PRS and response PRS for SL-RTT positioning. Herein, the SL-PRS is a PRS transmitted by a UE (or Tx UE) to a neighboring UE (or Rx UE), which may be distinguished from the request PRS/response PRS used in SL-PRS RTT positioning.

An SL-PRS slot group for the UE to transmit the SL-PRS will be described with the variable SL-PRS slot group jump defined in FIG. 13. The value of the variable SL-PRS slot group jump may be determined by the UE/BS/network and then signaled in first stage SCI and/or second stage SCI on a PSCCH and/or over a PSSCH. Alternatively, the value of the variable SL-PRS slot group jump may be preconfigured. On the other hand, the default value of SL-PRS slot group jump may be set to 1 in advance.

When the SL-PRS slot group jump is 1, the SL-PRS may be transmitted in every SL-PRS slot group. For example, the SL-PRS may be transmitted in SL-PRS slot group (n), SL-PRS slot group (n+1), SL-PRS slot group (n+2), etc.

Alternatively, when the SL-PRS slot group jump is 2, the SL-PRS may be transmitted in SL-PRS slot groups arranged at intervals of two SL-PRS slot groups. For example, the SL-PRS may be transmitted in SL-PRS slot group (n), SL-PRS slot group (n+2), SL-PRS slot group (n+4), etc.

Alternatively, when the SL-PRS slot group jump is X, the SL-PRS may be transmitted in SL-PRS slot groups arranged at intervals of X SL-PRS slot groups. For example, the SL-PRS may be transmitted in SL-PRS slot group (n), SL-PRS slot group (n+X), SL-PRS slot group (n+2X), etc.

In DCC operation for sidelink positioning, congestion that may be caused by an increase in the number of UEs participating in positioning may be reduced by increasing the value of SL-PRS slot group jump.

When each UE participates in SL-TDoA positioning and SL-RTT positioning, the request PRS (or response PRS) and SL-PRS may or may not be transmitted/received in the same SL-PRS slot, depending on the degree of use of SL-PRS resources within an SL-PRS slot and/or the configuration/allocation of SL-PRS resources within the SL-PRS slot, similarly or identically to the above-described methods for SL-RTT positioning.

When each UE participates in SL-TDoA positioning and SL-RTT positioning, the UE may transmit the SL-PRS and the request PRS and/or response PRS in the same SL-PRS slot.

The above-described SL-PRS resource management methods considering various positioning operations are proposed to efficiently support various positioning operations such as SL-RTT positioning and SL-TDoA positioning on limited channel resources on the assumption that sidelink positioning services between UEs are provided in the legacy NR-V2X system.

The proposed methods of transmitting the request PRS/response PRS in different SL-PRS slot groups in the SL-RTT positioning operation may increase the efficiency of use of limited SL-PRS resources. In addition, the proposed methods of transmitting the request PRS/response PRS in the same SL-PRS slot group in the SL-RTT positioning operation may guarantee low-latency positioning. The proposed pairing methods based on non-contiguous SL-PRS slot groups in the SL-RTT positioning and SL-TDoA positioning operations may increase the flexibility of each positioning operation. In particular, the methods may effectively reduce congestion in the use of SL-PRS resources that may be caused by an increase in the number of UEs participating in positioning. The methods of providing one or more SL-PRS slot groups for transmission of the response PRS in accordance with an SL-PRS slot group for transmission of the request PRS in the SL-RTT positioning operation and the methods of selecting, by the Rx UE, an SL-PRS slot group for transmission of the final response PRS may increase the flexibility of the positioning operation. In addition, the methods may effectively reduce the congestion in the use of SL-PRS resources that may be caused by an increase in the number of UEs participating in positioning.

Figure 18:
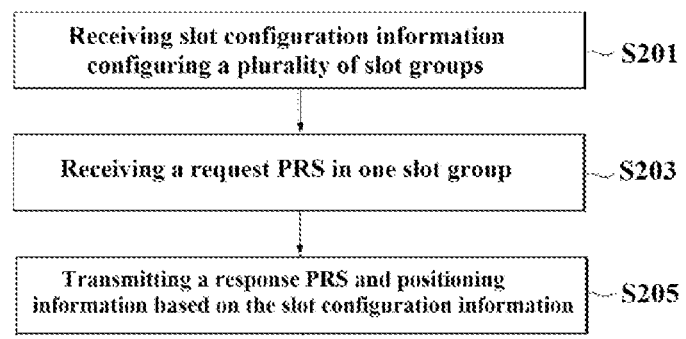
FIG. 18 is a diagram for explaining a method by which a first UE transmits a response PRS based on slot configuration information.

FIG. 18 is a diagram for explaining a method by which a first UE transmits a response PRS based on slot configuration information.

Referring to FIG. 18, the first UE may receive the slot configuration information configuring a plurality of slot groups related to a PRS (S201). That is, as described above, the first UE may be configured with the plurality of slot groups capable of transmitting and receiving a request PRS and a response PRS based on the slot configuration information, and in this case, the plurality of slot groups may include one or more contiguous slots.

The slot configuration information may further include information on a pairing relationship between the request PRS and response PRS as described above. Alternatively, the information on the pairing relationship may be provided to the first UE through separate signaling.

Alternatively, as described above, the slot configuration information may include the following parameters: SL-PRSslotgroupjump indicating an interval between the plurality of slot groups and PRS-ResourceRepetitionFactor indicating the number of slots included in a slot group. The plurality of slot groups may be configured or specified (or determined) by SL-PRSslotgroupjump and PRS-ResourceRepetitionFactor.

The value of SL-PRSslotgroupjump may be determined to control congestion depending on the number of UEs participating in positioning in the surrounding area.

Next, the first UE may receive the request PRS that requests transmission of the response PRS in one slot group among the plurality of slot groups (S203). Specifically, the first UE may receive the request PRS in any one slot among a plurality of slots included in the one slot group, and the request PRS may be transmitted from other UEs.

Alternatively, based on the request PRS, the first UE may measure or estimate positioning information related to positioning such as a time at which the request PRS is received and a difference between a time at which the request PRS is transmitted and a time at which the request PRS is received.

Next, the first UE may transmit the response PRS and/or positioning information based on the slot configuration information (S205). Depending on a slot pairing relationship between the request PRS and response PRS based on the slot configuration information, the first UE may determine the location of a second slot, which is related to the location of a first slot in the one slot group where the request PRS is received. The second slot may be a slot in which the response PRS is transmitted. In this case, the second slot may be determined such that the second slot belongs to the same slot group as that of the first slot or to a slot group different from that of the first slot. Alternatively, the second slot may be determined to be a slot contiguous with the first slot in the time domain within the same slot group as that of the first slot.

The first UE may obtain pairing information related to the positioning type of the received request PRS based on the slot configuration information. That is, the slot configuration information may provide the pairing information for each positioning type of the request PRS. For example, when the request PRS is related to SL-RTT, the first UE may determine the second slot as a slot in the same slot group as that of the first slot based on the slot configuration information. Alternatively, the first UE may determine the second slot as the slot contiguous with the first slot in the time domain. On the other hand, when the request PRS is related to SL-TDoA, the first UE may determine the second slot as a slot non-contiguous with the first slot in the time domain based on the slot configuration information. Alternatively, the first UE may determine the second slot as a slot in a slot group different from the slot group including the first slot.

Based on a time-domain relationship between the second slot and the first slot, the first UE may determine whether to transmit the positioning information together with the response PRS in the second slot. The positioning information may include information measured or estimated in relation to positioning such as a difference between a time at which the request PRS is received and a time at which the response PRS is transmitted and/or a difference between a time at which the request PRS is transmitted and a time at which the response PRS is received.

Specifically, the first UE may specify or determine the slot contiguous with the first slot in the time domain as the second slot based on the pairing information. The first UE may transmit the response PRS in the second slot and transmit the positioning information in a third slot (i.e., a slot located after the second slot or a slot in another slot group), which is different from the second slot. Alternatively, the first UE may specify or determine the slot non-contiguous with the first slot in the time domain as the second slot based on the pairing information. In this case, the first UE may transmit the response PRS and the positioning information together in the second slot. When the first UE transmits the positioning information in the third slot rather than the second slot, the first UE may transmit scheduling information on the third slot in advance to a UE that has transmitted the request PRS.

Alternatively, the first UE may specify or determine at least two slots as slots corresponding to the first slot based on the pairing information. If the speed of the first UE is greater than or equal to a predetermined threshold speed, the first UE may specify a slot closest to the first slot in the time domain among the at least two slots as the second slot. On the other hand, when the speed of the first UE is less than the predetermined threshold speed, the first UE may randomly specify one of the at least two slots as the second slot. In this case, the first UE may determine whether to transmit the positioning information in the second slot or the third slot, depending on whether the first slot and second slot are contiguous in the time domain.

Alternatively, the first UE may specify or determine at least two slots as slots corresponding to the first slot based on the pairing information. In this case, the first UE may estimate a channel state based on the request PRS or separate measurements. If the estimated channel state is worse than a predetermined channel state, the first UE may determine the earliest slot in time among the at least two slots as the second slot (based on speed increase, interference with a PRS from another UE, etc.)

Figure 19:
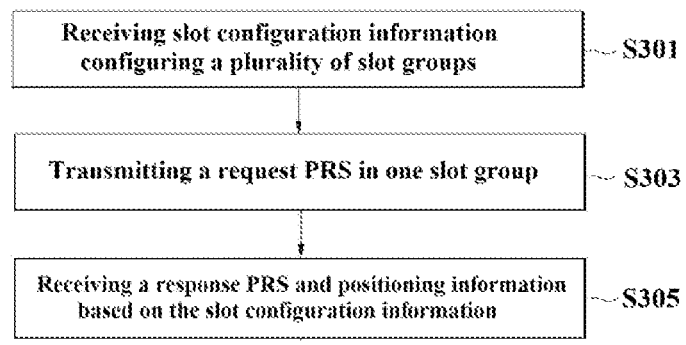
FIG. 19 is a diagram for explaining a method by which a second UE receives a response PRS.

FIG. 19 is a diagram for explaining a method by which a second UE receives a response PRS.

Referring to FIG. 19, the second UE may receive slot configuration information configuring a plurality of slot groups related to a PRS (S301). As described above with reference to FIG. 18, the second UE may be configured with the plurality of slot groups capable of transmitting and receiving a request PRS and a response PRS based on the slot configuration information. The plurality of slot groups may include one or more contiguous slots.

The slot configuration information may further include information on a pairing relationship between the request PRS and response PRS as described above. Alternatively, the information on the pairing relationship may be provided to the second UE through separate signaling. Further, the second UE may configure the pairing relationship and transmit the pairing relationship together with the request PRS.

Alternatively, as described above, the slot configuration information may include the following parameters: SL-PRSslotgroupjump indicating an interval between the plurality of slot groups and PRS-ResourceRepetitionFactor indicating the number of slots included in a slot group. The plurality of slot groups may be configured or specified (or determined) by SL-PRSslotgroupjump and PRS-ResourceRepetitionFactor.

The value of SL-PRSslotgroupjump may be determined to control congestion depending on the number of UEs participating in positioning in the surrounding area.

Next, the second UE may transmit the request PRS that requests transmission of the response PRS in one slot group among the plurality of slot groups (S303). Specifically, the second UE may select one slot group from among the plurality of slot groups and then select a first slot, which is a slot for transmission of the request PRS, within the selected one slot group in a predefined or random way. The second UE may transmit the request PRS in the selected first slot. Alternatively, the second UE may transmit information on the first slot in which the request PRS is to be transmitted or reservation information in advance through positioning signaling or positioning scheduling signals.

The second UE may transmit the request PRS in order to request a UE supposed to receive the request PRS to transmit positioning information related to positioning such as a time at which the request PRS is received and a difference between a time at which the request PRS is transmitted and a time at which the request PRS is received.

Next, the second UE may receive the response PRS and/or positioning information based on the slot configuration information (S305). Depending on a slot pairing relationship between the request PRS and response PRS based on the slot configuration information, the second UE may determine the location of a second slot, which is related to the location of the first slot in the one slot group where the request PRS is received. The second slot may be a slot in which the response PRS is transmitted. In this case, the second slot may be determined such that the second slot belongs to the same slot group as that of the first slot or to a slot group different from that of the first slot. Alternatively, the second slot may be determined to be a slot contiguous with the first slot in the time domain within the same slot group as that of the first slot.

The slot configuration information may provide the pairing information for each positioning type of the request PRS. For example, when the second UE transmits the request PRS requesting measurement information related to SL-RTT, the second UE may receive the response PRS in a slot in the same slot group as the first slot or the slot contiguous with the first slot in the time domain based on the slot configuration information. Alternatively, when the second UE transmits the request PRS requesting positioning information related to SL-TDoA, the second UE may receive the request PRS in a slot non-contiguous with the first slot in the time domain or in a slot in a slot group different from the slot group including the first slot, based on the slot configuration information, Based on a time-domain relationship between the second slot and the first slot, the second UE may identify or determine whether the positioning information is also received in the second slot together with the response PRS. The positioning information may include information measured or estimated in relation to positioning such as a difference between a time at which the request PRS is received and a time at which the response PRS is transmitted and/or a difference between a time at which the request PRS is transmitted and a time at which the response PRS is received Specifically, when the second UE receives the response PRS in the second slot, which is contiguous with the first slot in the time domain, the second UE may determine that the positioning information will not be received together in the second slot based on the pairing information. In this case, the second UE may receive separate scheduling signaling from the UE transmitting the response PRS. Then, the second UE may obtain information on a third slot (a slot located after the second slot or a slot in another slot group) in which the positioning information is to be received and then receive the positioning information in the third slot. That is, upon receiving the response PRS, the second UE may measure or estimate related positioning information. Then, the second UE may estimate or determine its own location based on the received positioning information and the positioning information measured by the second UE.

When the response PRS is received in the second slot, which is non-contiguous with the first slot in the time domain, the second UE may also receive the positioning information together in the second slot based on the pairing information.

Time Frequency Patterns of SL-PRS Resource

In the NR-V2X sidelink positioning system, when multiple Tx UEs transmit different SL-PRSs on an SL-PRS resource in the same SL-PRS slot with a comb pattern (in units of REs) by performing frequency division multiplexing (FDM) thereon, and when an Rx UE performs ToA measurement by performing frequency division demultiplexing (FDdM) on SL-PRSs of interest among the frequency division multiplexed (FDMed) SL-PRSs (similarly to the legacy LTE/NR positioning system), ToA accuracy may be degraded due to an increase in interference between adjacent SL-PRSs. In this case, the interference between adjacent SL-PRSs may be regarded as interference between adjacent subcarriers, which may occur in a section where SL-PRS resources used for SL-PRS transmission are adjacent to each other. The interference may increase in the following cases: when there is no power control for SL-PRSs transmitted from each Tx UE (or when power control is not perfect); when the power of SL-PRSs received by the Rx UE from the multiple Tx UEs is different from each other; and/or when the Tx UEs have significant synchronization errors.

In the present disclosure, the following SL-PRS resource patterns: (1) group-wise staggering SL-PRS pattern; (2) group-wise non-staggering SL-PRS pattern; and (3) group-wise partial-staggering SL-PRS pattern will be described in order to minimize the effects of the interference between adjacent SL-PRSs, which may occur when UEs participating in positioning transmit different SL-PRSs based on FDM and receive the SL-PRSs based on FDdM (or minimize the effects of the interference between adjacent subcarrier generated in a section where SL-PRS resources used for SL-PRS transmission are adjacent).

(1) Group-Wise Staggering PRS Pattern

Hereinafter, the main characteristics of a group-wise staggering SL-PRS pattern of an SL-PRS resource will be described.

In the group-wise staggering SL-PRS pattern, a group-level comb pattern may be formed by arranging RE groups, each consisting of one or more REs, at regular intervals within one (OFDM) symbol. The formed group-level comb pattern (or RE-group-level comb pattern) may be staggered over one or more symbols. Alternatively, the group-level comb size may be defined based on the maximum number of SL-PRS resources capable of being FDMed. In this case, the RE group size and the interval between RE groups may be the same for each SL-PRS resource.

Each RE group may be composed of an available RE and a null RE (or guard RE). The available RE and null RE have the following features.

The available RE is a RE used for SL-PRS transmission, and one or more available REs may be present in an RE group and placed at arbitrary positions. The null RE refers to an empty RE that is not used for SL-PRS transmission in order to minimize the effects of the interference between adjacent SL-PRSs, which may occur when multiple Tx UEs transmit different SL-PRSs in the same SL-PRS slot based on FDM and the Rx UE performs ToA measurement by performing FDdM on SL-PRSs of interest among the FDMed SL-PRS. The null RE may be located around the higher frequency and/or lower frequency positions of the RE group in order to minimize the interference between adjacent subcarriers generated in a section where SL-PRS resources used for SL-PRS transmission are adjacent to each other. The number of null REs may be set to 0, 1, or more in consideration of the subcarrier interference, which may vary depending on the characteristics of systems or surrounding channel environments.

The group-wise staggering SL-PRS pattern may provide excellent ToA measurement performance in an environment with high channel frequency selectivity.

The group-wise staggering SL-PRS pattern may be determined by the BS/network/LMF and transmitted to the UE through SIB/MIB/RRC signaling/physical layer signaling. Alternatively, the group-wise staggering SL-PRS pattern may be preconfigured or predefined. When the group-wise staggering SL-PRS pattern applied to UEs needs to be shared, related signaling may be transmitted in second stage SCI.

Hereinafter, main signaling for determining the group-wise staggering SL-PRS pattern will be described.

An indicator indicating whether the SL-PRS resource has a staggering SL-PRS pattern, a non-staggering SL-PRS pattern, or a partial staggering SL-PRS pattern may be signaled. The RE group size or the number of REs in a group-level comb may be greater than or equal to 1. The size or number of null REs in the RE group may be greater than or equal to 0. In this case, the size or number of available REs may be calculated based on the RE group size and the size of null REs.

In addition, the location of null REs in the RE group may be signaled. The null REs may be located around the higher frequency and/or lower frequency positions of the RE group. Alternatively, the location of null REs in the RE group may be preconfigured. The location of available REs in the RE group may be determined based on the location of null REs.

The group-level comb size may be signaled. The group-level comb size may be greater than or equal to 1. If the group-level comb size is 1, RE groups may be arranged consecutively. Alternatively, the number of symbols staggered based on the group-level comb or the number of symbols used to form the group-wise staggering SL-PRS pattern may be signaled.

The start symbol position/offset of the group-wise staggering SL-PRS pattern or the start symbol position/offset of the SL-PRS resource may be signaled in an SL-PRS slot. Alternatively, the start frequency position/offset of the group-level comb in the first symbol where the group-wise staggering SL-PRS pattern starts or the frequency position/offset of the starting RE group in the first symbol of the SL-PRS resource may be signaled.

The SL-PRS resource having the group-wise staggering SL-PRS pattern may be defined in a logical SL-PRS slot for SL-PRS transmission as in NR positioning. Alternatively, the SL-PRS resource having the group-wise staggering SL-PRS pattern may be defined in an unlicensed band, defined over symbols not used for packet transmission in a V2X slot, or defined over guard symbols of the NR-V2X system.

FIGS. 20, 21, 22, and 23 are diagrams for explaining time/frequency resource configurations of a group-wise staggering SL-PRS pattern for SL-PRS transmission in an SL-PRS slot.

Figure 20:
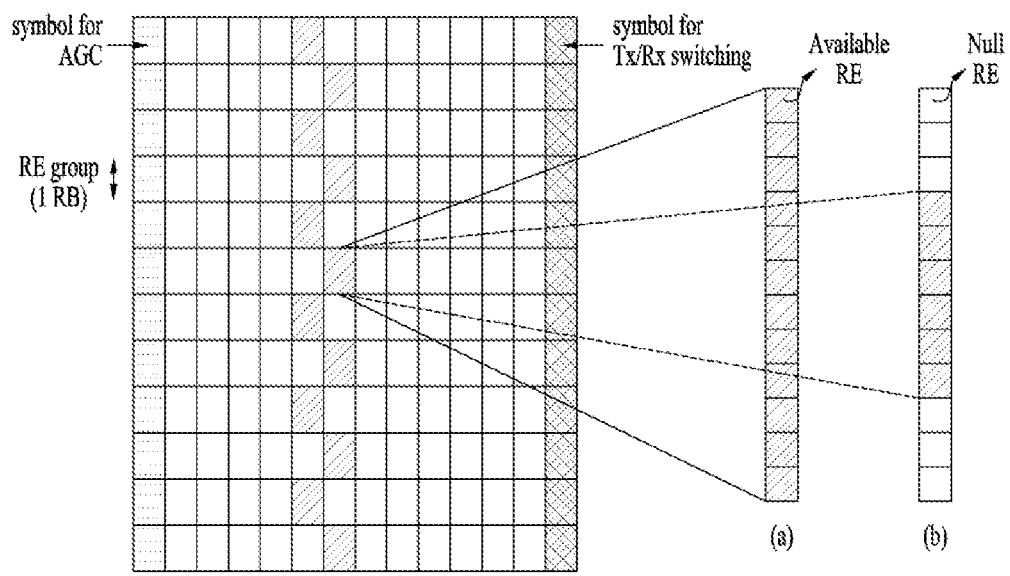
FIGS. 20, 21, 22, and 23 are diagrams for explaining time/frequency resource configurations of a group-wise staggering SL-PRS pattern for SL-PRS transmission in an SL-PRS slot.

Referring to FIG. 20, an SL-PRS resource consists of a total of 12 RBs, and an RE group consists of one RB (or consists of 12 REs). The size of a group-level comb is 2, the group-level comb is staggered over two symbols, and the SL-PRS resource may start at the sixth symbol.

Referring to FIG. 20(*a*), the number of null REs is 0, and thus the entire RE group may consist of available REs.

If the effects of interference between adjacent SL-PRSs are not large, a method of using the entire RE group for SL-PRS transmission may improve the performance of ToA measurement. On the other hand, when the effects of the interference between adjacent SL-PRSs are large, RE resources located at both ends of the RE group may be affected by interference from adjacent RE resources, and as a result, the performance of ToA measurement may be degraded.

Referring to FIG. 20(b), the number of null REs is greater than 0, and thus, three null REs may be located at each of the higher frequency and lower frequency positions of the RE group.

If the effects of interference between adjacent SL-PRSs are large, a method of not using REs located at both ends of the RE group to minimize or prevent interference between RE resources located at both ends of adjacent RE groups may improve the performance of ToA measurement. In addition, the use of null REs may extend the transmission coverage of the Tx UE and also increase the RSRP of the Rx UE. On the other hand, if the effects of the interference between adjacent SL-PRSs are not large, the method may relatively degrade the performance of ToA measurement, compared to the method of using the entire RE group for SL-PRS transmission in FIG. 20(a).

Figure 21:
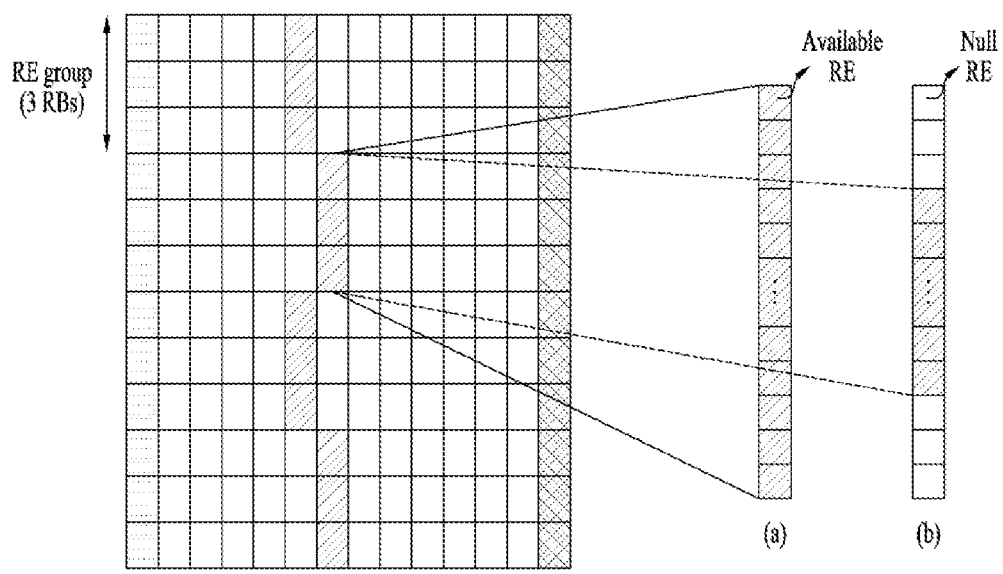

Referring to FIG. 21, an SL-PRS resource consists of a total of 12 RBs, and an RE group consists of three RBs (or consists of 36 REs). The size of a group-level comb is 2, the group-level comb is staggered over two symbols, and the SL-PRS resource may start at the sixth symbol. The details and characteristics of FIGS. 21(a) and 21(b) are similar to those of FIG. 20.

Figure 22:
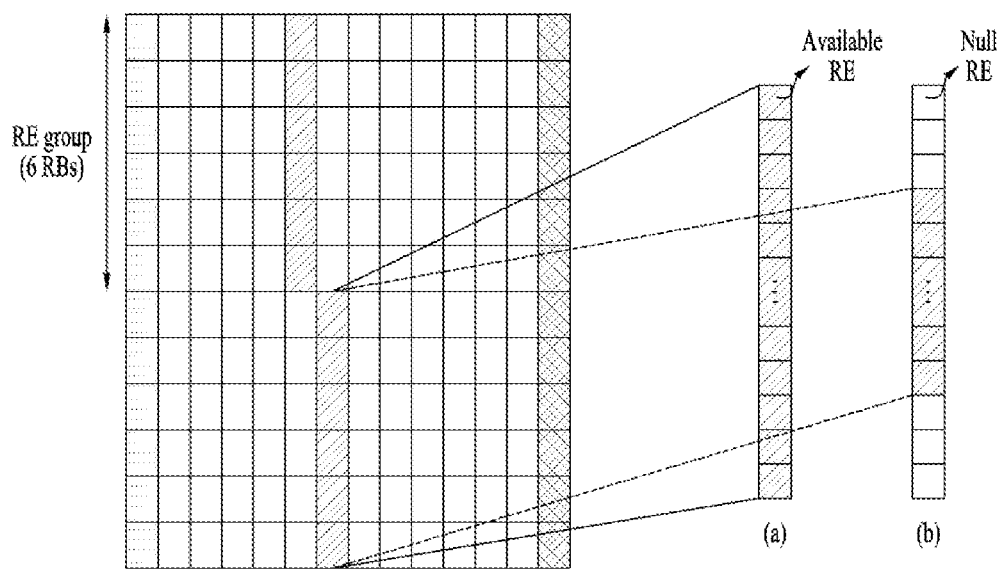

Referring to FIG. 22, an SL-PRS resource consists of a total of 12 RBs, and an RE group consists of 6 RBs (or 72 REs). The size of a group-level comb is 2, the group-level comb is staggered over two symbols, and the SL-PRS resource may start at the sixth symbol. The RE group size may be determined by the total size of RBs allocated to the SL-PRS resource and the group-level comb size. That is, the RE group size may be obtained by dividing the total RB size by the group-level comb size. For example, the RE group size may be equal to or correspond to (the size of total RBs allocated to the SL-PRS resource)/(the group-level comb size). The details and characteristics of FIGS. 22(a) and 22(b) are similar to those of FIG. 20.

Figure 23:
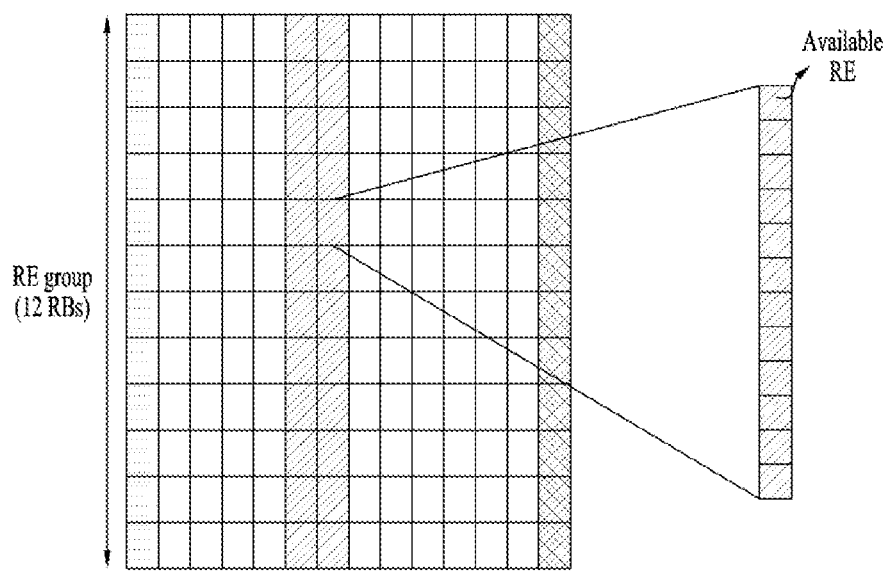

Referring to FIG. 23, an SL-PRS resource consists of a total of 12 RBs, and an RE group consists of 12 RBs (or 144 REs). The size of a group-level comb is 1, the SL-PRS resource consists of two symbols, and the SL-PRS resource may start at the sixth symbol. A group-wise staggering SL-PRS pattern with a group-level comb size of 1 may be the same as a group-wise non-staggering SL-PRS pattern with a group-level comb size of 1, which will be described later.

The use of the SL-PRS resource with the group-level comb size of 1 may have the following characteristics.

Since multiple Tx UEs transmit SL-PRSs on time-divided SL-PRS resources in the same SL-PRS slot, the SL-PRS interference problem, which is observed when an SL-PRS resource with a group-level comb size of 2 or more is used, may not occur. Accordingly, the Rx UE may perform accurate ToA measurement.

When the number of symbols used for configuring an SL-PRS resource is 1, the total number of SL-PRS resources available for SL-PRS transmission in an SL-PRS slot may be maximized. However, in this case, from the perspective of the Rx UE, the performance of ToA measurement may be degraded if there occurs a synchronization error between the Tx UE and Rx UE.

When the number of symbols used for configuring an SL-PRS resource is 2, the total number of SL-PRS resources available for SL-PRS transmission in an SL-PRS slot may be reduced by half compared to when the number of symbols used for configuration an SL-PRS resource is 1. However, it is possible to minimize ToA measurement performance degradation that may be caused by a synchronization error between the Tx UE and Rx UE.

Compared to when the SL-PRS resource with the group-level comb size of 2 or more is used, the SL-PRS transmission coverage of the UE may decrease, but excellent ToA measurement performance may be achieved in positioning between UEs with fast movement speeds. That is, when ToA measurement needs to be performed per symbol due to the fast movement speed of the UE, the number of available REs used for SL-PRS transmission per symbol may increase, thereby providing the excellent ToA measurement performance.

(2) Group-Wise Non-Staggering PRS Pattern

Hereinafter, the main characteristics of a group-wise non-staggering SL-PRS pattern of an SL-PRS resource will be described.

Compared to the group-wise staggering SL-PRS pattern, the group-wise non-staggering SL-PRS pattern may have the following characteristics.

A group-level comb pattern may be formed by arranging RE groups at regular intervals within one symbol identically or similarly to the group-wise staggering SL-PRS pattern. In this case, each RE group may be composed of the available RE and null RE. Unlike the group-wise staggering SL-PRS pattern, the formed group-level comb pattern may be equally applied without being staggered over one or more symbols.

The group-wise non-staggering SL-PRS pattern may provide excellent ToA measurement performance in an environment with high channel time selectivity. A group-wise non-staggering SL-PRS pattern with a group-level comb size of 1 may be the same as a group-wise staggering SL-PRS pattern with a group-level comb size of 1 described above.

The group-wise non-staggering SL-PRS pattern may be determined by the BS/network/LMF and transmitted to the UE through SIB/MIB/RRC signaling/physical layer signaling. Alternatively, the group-wise non-staggering SL-PRS pattern may be preconfigured or predefined. When the group-wise non-staggering SL-PRS pattern needs to be shared by UEs who apply the pattern, related signaling may be transmitted in second stage SCI. In addition, main signaling for determining the group-wise non-staggering SL-PRS pattern may be defined identically or similarly to the signaling for determining the group-wise staggering SL-PRS pattern.

The SL-PRS resource having the group-wise non-staggering SL-PRS pattern may be defined in a logical SL-PRS slot for SL-PRS transmission as in NR positioning. Alternatively, the SL-PRS resource having the group-wise non-staggering SL-PRS pattern may be defined in an unlicensed band, defined over symbols not used for packet transmission in a V2X slot, or defined over guard symbols of the NR-V2X system.

Time/frequency resources of the group-wise non-staggering SL-PRS pattern will be described in detail with reference to FIGS. 24 and 25.

Figure 24:
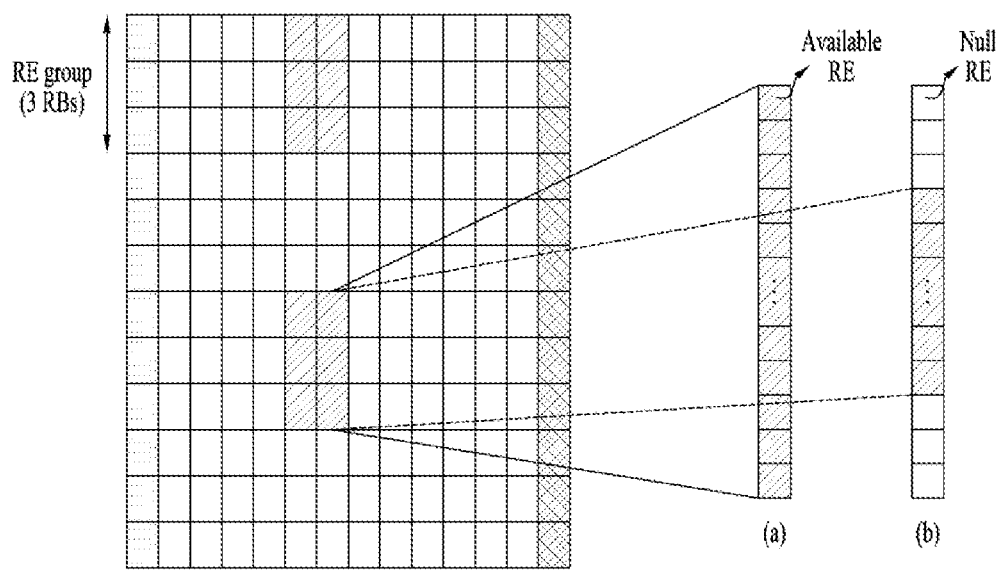
FIGS. 24 and 25 are diagrams for explaining time/frequency resource configurations of a group-wise non-staggering SL-PRS pattern for SL-PRS transmission in an SL-PRS slot.
Figure 25:
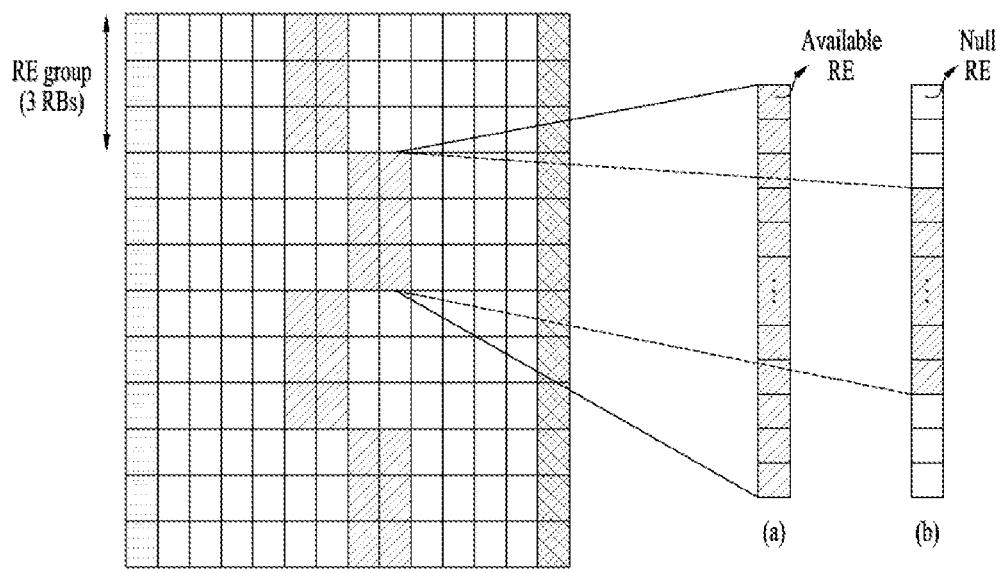

FIGS. 24 and 25 are diagrams for explaining time/frequency resource configurations of a group-wise non-staggering SL-PRS pattern for SL-PRS transmission in an SL-PRS slot.

Referring to FIG. 24, an SL-PRS resource consists of a total of 12 RBs, and an RE group consists of three RBs (or consists of 36 REs). The size of a group-level comb is 2, the group-level comb is staggered over two symbols, and the SL-PRS resource may start at the sixth symbol. The details and characteristics of FIGS. 24(a) and 24(b) are similar to those of FIGS. 20 and/or 21.

Hereinafter, the main characteristics of a group-wise partial-staggering SL-PRS pattern of an SL-PRS resource will be described.

Compared to the group-wise staggering SL-PRS pattern and/or group-wise non-staggering SL-PRS pattern, the group-wise partial-staggering SL-PRS pattern may have the following characteristics.

A group-level comb pattern may be formed by arranging RE groups at regular intervals within one symbol identically or similarly to the group-wise staggering SL-PRS pattern and/or group-wise non-staggering SL-PRS pattern. In this case, each RE group may be composed of the available RE and null RE. For the group-level comb pattern formed by combining the group-wise staggering SL-PRS pattern and the group-wise non-staggering SL-PRS pattern, a non-staggering SL-PRS pattern may be applied over one or more symbols, and the formed non-staggering SL-PRS pattern may be staggered over one or more symbols.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 26:
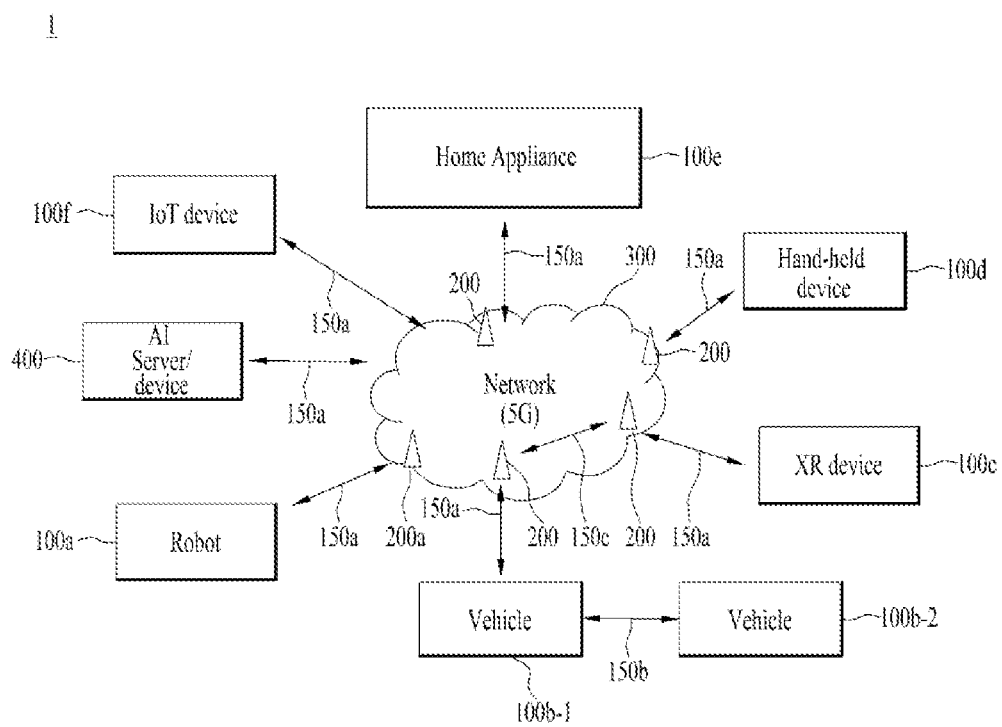
FIG. 26 illustrates a communication system applied to the present disclosure.

FIG. 26 illustrates a communication system applied to the present disclosure.

Referring to FIG. 26, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 27:
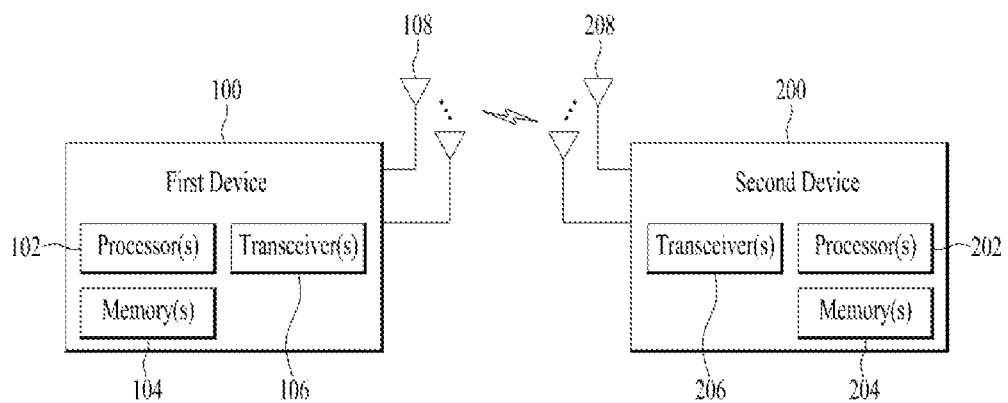
FIG. 27 illustrates wireless devices applicable to the present disclosure.

FIG. 27 illustrates a wireless device applicable to the present disclosure.

Referring to FIG. 27, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, a UE or first UE may include the processor(s) 102 connected to the transceiver(s) 106 (or RF transceiver) and the memory(s) 104. The memory(s) 104 may include at least one program for performing operations related to the embodiments described above with reference to FIGS. 11 to 25.

The processor(s) 102 may be configured to control the RF transceiver to: receive slot configuration information configuring a plurality of slot groups related to a PRS; receive a request PRS requesting transmission of the response PRS in one slot group among the plurality of slot groups; and transmit the response PRS and positioning information based on the slot configuration information. The response PRS may be transmitted in a second slot determined based on a location of a first slot in which the request PRS is received among a plurality of slots included in the one slot group and the slot configuration information. Whether the positioning information is transmitted in the second slot together with the response PRS may be determined depending on whether the first slot and the second slot are consecutive in a time domain.

Alternatively, a chipset including the processor(s) 102 and memory(s) 104 may be configured. The chipset may include: at least one processor; and at least one memory operably connected to the at least one processor and configured to, when executed, cause the at least one processor to perform operations. The operations may include: receiving slot configuration information configuring a plurality of slot groups related to a PRS; receiving a request PRS requesting transmission of the response PRS in one slot group among the plurality of slot groups; and transmitting the response PRS and positioning information based on the slot configuration information. The response PRS may be transmitted in a second slot determined based on a location of a first slot in which the request PRS is received among a plurality of slots included in the one slot group and the slot configuration information. Whether the positioning information is transmitted in the second slot together with the response PRS may be determined depending on whether the first slot and the second slot are consecutive in a time domain. In addition, the operations may include the operations of transmitting the response PRS according to the embodiments described in FIGS. 11 to 25 based on the program included in the memory(s) 104.

Alternatively, there is provided a computer-readable storage medium including at least one computer program configured to cause at least one processor to perform operations. The operations may include: receiving slot configuration information configuring a plurality of slot groups related to a PRS; receiving a request PRS requesting transmission of the response PRS in one slot group among the plurality of slot groups; and transmitting the response PRS and positioning information based on the slot configuration information. The response PRS may be transmitted in a second slot determined based on a location of a first slot in which the request PRS is received among a plurality of slots included in the one slot group and the slot configuration information. Whether the positioning information is transmitted in the second slot together with the response PRS may be determined depending on whether the first slot and the second slot are consecutive in a time domain. In addition, the operations may include the operations of transmitting the response PRS according to the embodiments described in FIGS. 11 to 25 based on the program included in the memory(s) 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Specifically, a UE or second UE may include the processor(s) 202 connected to the transceiver(s) 206 (or RF transceiver) and the memory(s) 204. The memory(s) 204 may include at least one program for performing operations related to the embodiments described above with reference to FIGS. 11 to 25.

The processor(s) 202 may be configured to control the RF transceiver to: receive slot configuration information configuring a plurality of slot groups related to a PRS; transmit a request PRS in one slot group among the plurality of slot groups; and receive the response PRS and positioning information based on the slot configuration information. The response PRS may be received in a second slot determined based on a location of a first slot in which the request PRS is transmitted among a plurality of slots included in the one slot group and the slot configuration information. Whether the positioning information is received in the second slot together with the response PRS may be determined depending on whether the first slot and the second slot are consecutive in a time domain. In addition, the operations may include the operations of receiving the response PRS according to the embodiments described in FIGS. 11 to 25 based on the program included in the memory(s) 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 28:
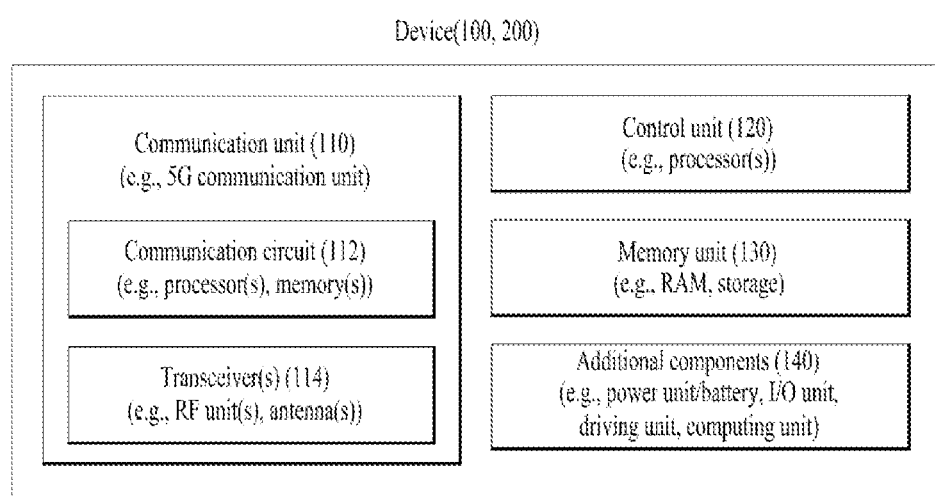
FIG. 28 illustrates another example of a wireless device to which the present disclosure is applied. The wireless device may be implemented in various forms according to use-examples/services.

FIG. 28 illustrates another example of a wireless device applied to the present disclosure. The wireless device may be implemented in various forms according to a use-case/service (refer to FIG. 26)

Referring to FIG. 28, wireless devices 100 and 200 may correspond to the wireless devices 100 and 200 of FIG. 27 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 27. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 26), the vehicles (100*b*-1 and 100*b*-2 of FIG. 26), the XR device (100*c* of FIG. 26), the hand-held device (100*d* of FIG. 26), the home appliance (100*e* of FIG. 26), the IoT device (100*f* of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 29:
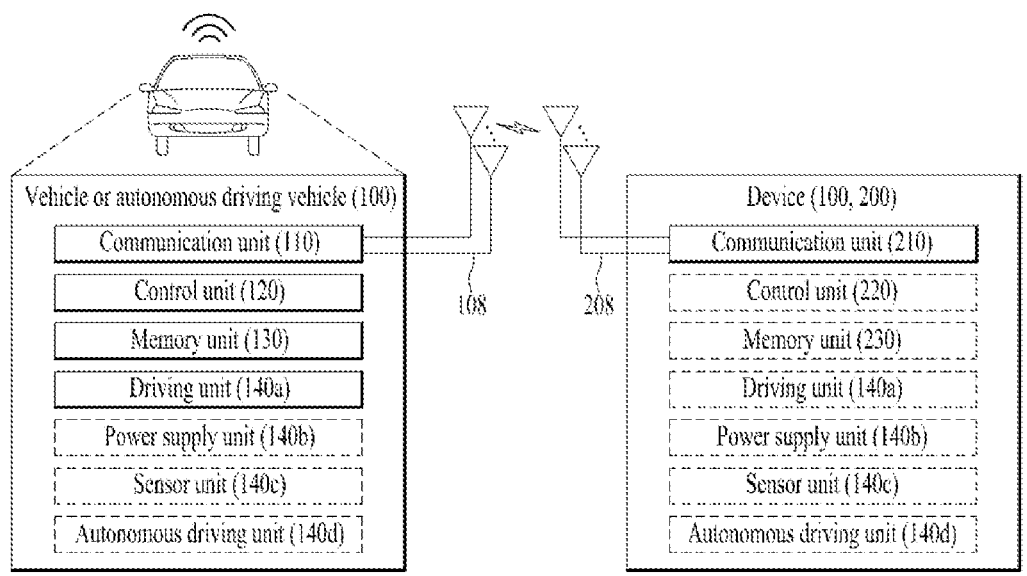
FIG. 29 illustrates a vehicle or an autonomous driving vehicle applied to the present disclosure.

Examples of Vehicles or Autonomous Vehicles to which the Present Disclosure is Applied FIG. 29 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 29, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), and Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method by a first user equipment (UE) comprising:
receiving a synchronization signal/physical broadcast channel (SS/PBCH) block for direct communication between UEs,
wherein the SS/PBCH block includes a primary synchronization signal (PSS) for the direct communication between the UEs, a secondary synchronization signal (SSS) for the direct communication between the UEs, and a PBCH for the direct communication between the UEs;
performing a synchronization for the direct communication between the UEs based on the SS/PBCH block;
receiving slot allocation information including information related to a plurality of slots for a positioning reference signal (PRS) for the direct communication between the UEs, wherein the slot allocation information further includes slot pairing information between a first PRS and a second PRS that is transmitted in response to a reception of the first PRS;
receiving the first PRS in a first slot among the plurality of slots;
obtaining measurement information based on the first PRS; and
transmitting the second PRS
in a second slot paired with the first slot among the plurality of slots based on the slot pairing information,
wherein, based on the first slot and the second slot being consecutive in a time domain, the measurement information for the first PRS is transmitted in a third slot following the second slot; and
wherein, based on the first slot and the second slot being non-consecutive in the time domain, the measurement information for the first PRS is transmitted in the second slot together with the second PRS.

2. The method of claim 1, wherein the measurement information comprises a difference between a time at which the first PRS is received and a time at which the second PRS is transmitted.

3. The method of claim 1, wherein based on the second slot including at least two slots according to the slot pairing information, the second slot is determined as a slot adjacent to the first slot in the time domain among the at least two slots based on a speed of the first UE that is greater than or equal to a predetermined threshold speed.

4. The method of claim 1, wherein the first PRS and the second PRS are PRSs for round trip time (RTT) positioning or time difference of arrival (TDoA) positioning.

5. A method by a second user equipment (UE) comprising:
- receiving a synchronization signal/physical broadcast channel (SS/PBCH) block for direct communication between UEs,
- wherein the SS/PBCH block includes a primary synchronization signal (PSS) for the direct communication between the UEs, a secondary synchronization signal (SSS) for the direct communication between the UEs, and a PBCH for the direct communication between the UEs;
- performing a synchronization for the direct communication between the UEs based on the SS/PBCH block;
- receiving slot allocation information including information related to a plurality of slots for a positioning reference signal (PRS) for the direct communication between the UEs, wherein the slot allocation information further includes slot pairing information between a first PRS and a second PRS that is transmitted in response to a reception of the first PRS;
- transmitting the first PRS in a first slot among the plurality of slots; and
- receiving the second PRS in a second slot paired with the first slot among the plurality of slots based on the slot pairing information
- wherein, based on the first slot and the second slot being consecutive in a time domain, measurement information for the first PRS is received in a third slot following the second slot, and
- wherein, based on the first slot and the second slot being non-consecutive in the time domain, the measurement information for the first PRS is transmitted in the second slot together with the second PRS.

6. A first user equipment (UE) comprising:
- a radio frequency (RF) transceiver; and
- a processor connected to the RF transceiver,
- wherein the processor is configured to control the RF transceiver to:
- receiving a synchronization signal/physical broadcast channel (SS/PBCH) block for direct communication between UEs,
- wherein the SS/PBCH block includes a primary synchronization signal (PSS) for the direct communication between the UEs, a secondary synchronization signal (SSS) for the direct communication between the UEs, and a PBCH for the direct communication between the UEs;
- performing a synchronization for the direct communication between the UEs based on the SS/PBCH block;
- receive slot allocation information including information related to a plurality of slots for a positioning reference signal (PRS) for the direct communication between the UEs, wherein the slot allocation information further includes slot pairing information between a first PRS and a second PRS that is transmitted in response to a reception of the first PRS;
- obtain measurement information based on the first PRS;
- receive the first PRS in a first slot among the plurality of slots; and
- transmit the second PRS
- in a second slot paired with the first slot among the plurality of slots based on the slot pairing information, and
- wherein, based on the first slot and the second slot being consecutive in a time domain, the measurement information for the first PRS is transmitted in a third slot following the second slot
- wherein, based on the first slot and the second slot being non-consecutive in the time domain, the measurement information for the first PRS is transmitted in the second slot together with the second PRS.

* * * * *